(12) United States Patent
Tojo et al.

(10) Patent No.: US 8,870,339 B2
(45) Date of Patent: Oct. 28, 2014

(54) INKJET IMAGE FORMING METHOD

(75) Inventors: Kaoru Tojo, Kanagawa (JP); Minoru Sakai, Kanagawa (JP); Tomoyuki Ohzeki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 512 days.

(21) Appl. No.: 13/031,262

(22) Filed: Feb. 21, 2011

(65) Prior Publication Data

US 2011/0205290 A1     Aug. 25, 2011

(30) Foreign Application Priority Data

Feb. 24, 2010   (JP) ................. 2010-039194

(51) Int. Cl.
| | | |
|---|---|---|
| B41J 2/015 | (2006.01) | |
| C09D 11/322 | (2014.01) | |
| B41J 2/21 | (2006.01) | |

(52) U.S. Cl.
CPC .............. *B41J 2/2114* (2013.01); *C09D 11/322* (2013.01)
USPC .................. 347/21; 347/43; 347/95

(58) Field of Classification Search
USPC .......... 347/15, 40–43, 95–100, 21; 106/31.13
See application file for complete search history.

(56) References Cited

U.S. PATENT DOCUMENTS

| | | | |
|---|---|---|---|
| 6,221,546 B1 | 4/2001 | Yau et al. | |
| 6,538,047 B1 | 3/2003 | Miyabayashi | |
| 7,578,587 B2 * | 8/2009 | Belelie et al. | 347/105 |
| 8,007,097 B2 * | 8/2011 | Sanada et al. | 347/100 |
| 2002/0107306 A1 * | 8/2002 | Wang et al. | 523/412 |
| 2005/0074601 A1 | 4/2005 | Onishi | |
| 2009/0202722 A1 | 8/2009 | Yanagi et al. | |
| 2009/0304927 A1 | 12/2009 | Kamibayashi et al. | |
| 2010/0003408 A1 | 1/2010 | Yanagi et al. | |
| 2011/0104407 A1 * | 5/2011 | Zhou | 428/32.1 |

FOREIGN PATENT DOCUMENTS

| | | |
|---|---|---|
| JP | 2867491 B2 | 3/1999 |
| JP | 2001-072935 | 3/2001 |
| JP | 2001-080199 | 3/2001 |
| JP | 2002-161223 | 6/2002 |
| JP | 2004-001446 | 1/2004 |
| JP | 2005-001342 | 1/2005 |
| JP | 2007-154133 | 6/2007 |
| JP | 2007-291399 A | 11/2007 |
| JP | 2009-166262 | 7/2009 |
| JP | 2009-190232 | 8/2009 |
| JP | 2009-297924 | 12/2009 |
| JP | 2010-023339 | 2/2010 |
| JP | 2010-031267 | 2/2010 |
| JP | 2010-221634 | 10/2010 |

OTHER PUBLICATIONS

Partial English language translation of the following: Office action dated Jun. 25, 2013 from the Japanese Patent Office in a Japanese patent application corresponding to the instant patent application.
Partial English language translation of the following: Office action dated Nov. 12, 2013 from the Japanese Patent Office in a Japanese patent application corresponding to the instant patent application.

* cited by examiner

*Primary Examiner* — Thinh Nguyen
(74) *Attorney, Agent, or Firm* — SOLARIS Intellectual Property Group, PLLC

(57) ABSTRACT

The present invention provides an inkjet image forming method including:
  forming an image by applying an ink composition containing a first color material and water onto a recording medium; and
  applying a treatment liquid containing a wax and water onto the image,
  wherein the treatment liquid contains a second color material, and the first color material and the second color material may be the same or different.

11 Claims, No Drawings

INKJET IMAGE FORMING METHOD

CROSS-REFERENCE TO RELATED APPLICATION

This application claims priority under 35 USC 119 from Japanese Patent Application No. 2010-039194, filed on Feb. 24, 2010, the disclosure of which is incorporated by reference herein.

BACKGROUND

1. Field of the Invention

The present invention relates to an inkjet image forming method.

2. Related Art

An inkjet recording method is a method of performing recording by ejecting ink in the form of liquid droplets from a number of nozzles provided in an inkjet head, and since the inkjet recording method is capable of recording high quality images on many kinds of various recording media, the method is being widely used.

For example, widely used as a colorant, which is one of the components included in ink materials, is a pigment, and the pigment is used in a state of being dispersed in a medium such as water. In the case of using a pigment in a dispersed state, properties such as a dispersed particle size in a dispersion, stability after being dispersed, size uniformity, ejectability from the ejection head, and image density are important, and extensive investigations have been conducted on the technologies to enhance these properties.

Furthermore, there is an increasing demand for recorded images with higher definition, so that investigations are also being conducted in various areas in order to further enhance the color developability, glossiness, abrasion resistance and the like of recorded images.

Among the technologies related to the situation described above, there has been suggested, as a technology of improving the color developability and glossiness of a recorded matter, an image forming method which uses a clear ink that contains polymer fine particles but does not contain a colorant (see, for example, Japanese Patent Application Laid-Open (JP-A) No. 2007-291399). Furthermore, there has been suggested ink which contains a wax emulsion in order to enhance the image quality or the like when printing is carried out on an ordinary paper (see, for example, Japanese Patent No. 2867491).

SUMMARY

The present invention has been made in view of the above circumstances and provides an inkjet image forming method including:

forming an image by applying an ink composition comprising a first color material and water onto a recording medium; and applying a treatment liquid comprising a wax and water onto the image, wherein the treatment liquid comprises a second color material, and the first color material and the second color material may be the same or different.

DETAILED DESCRIPTION OF THE INVENTION

The inkjet image forming method of the invention includes an ink applying step of forming an image by applying an ink composition containing a color material, a water-soluble organic solvent and water on a recording medium by an inkjet method, and a treatment liquid applying step of applying a treatment liquid containing a wax and water on the image formed. When the treatment liquid includes a color material, a content of the color material is no greater than 0.1% by mass, and the color material contained in the ink composition and the color material contained in the treatment liquid may be the same or different with each other.

When a treatment liquid containing a wax is applied on an image, the generation of processing flaws occurring when a recorded matter having an image formed thereon is processed, is suppressed, and thus the feel of relief of the images thus formed is suppressed.

<Ink Applying Step>

In the ink applying step, at least one ink composition containing a color material and water is applied on a recording medium by an inkjet method.

There are no particular limitations on the inkjet method, and any known system may be employed, for example, a charge control system that ejects ink by utilizing an electrostatic attraction force; a drop-on-demand system that utilizes vibration pressure of a piezoelectric element (pressure pulse system); an acoustic inkjet system that converts electric signals into acoustic beams, irradiates ink with the beams, and ejects the ink by utilizing a radiation pressure; and a thermal inkjet (BUBBLEJET (registered trademark)) system that heats ink to form bubbles and utilizes the pressure resulting therefrom.

Furthermore, the inkjet method described above includes the usage of a system that injects a large number of small-volume droplets of low-concentration ink called photo-ink; a system that improves an image quality by using plural kinds of inks having a substantially identical color tone but different concentrations; and a system that makes use of colorless transparent ink.

The inkjet head used in the inkjet method may employ an on-demand system or a continuous system. Furthermore, there are no particular limitations on ink nozzles and the like that are used when recording is performed by the inkjet method, and the ink nozzles and the like may be appropriately selected according to the purpose.

The inkjet method may employ a shuttle system in which a short serial head is used, and recording is performed while the head is allowed to move in a scanning manner along the width direction of the recording medium; as well as a line system that makes use of a line head in which recording elements are arranged to face the entire length of one side of the recording medium. In the line system, image recording may be performed over the entire surface of the recording medium by scanning the recording medium in the direction perpendicular to the direction in which the recording elements are arranged, and thus a conveyance system such as a carriage that scans the short serial head, is unnecessary. Furthermore, since complicated scan control of the movement of the carriage and of the recording medium is not needed, and only the recording medium is made to move, an improvement of the recording speed may be realized, as compared with the shuttle system. The inkjet image forming method of the invention may be applied to any of these, but in general, when the inkjet image forming method is applied to the line system which does not implement dummy jetting, the effects of enhancing the ejection accuracy and the abrasion resistance of images are greater.

In the ink applying step according to the invention, when the line system is employed, recording may be appropriately carried out not only by using one kind of ink composition only, but also by using two or more kinds of ink compositions, such that the interval of ejection (droplet ejection) between an ink composition that is ejected first (n-th color (n≥1), for example, the second color) and an ink composition that is ejected subsequently to the previous ink composition ((n+1)-th color, for example, the third color), is adjusted to 1 second or less. According to the invention, by setting the interval of ejection at 1 second or less in the line system, images having excellent abrasion resistance with suppressed occurrence of blocking may be obtained at a recording speed that is higher than the conventional speeds, while the bleeding or mixed colors of different colors, which results from the interference of ink droplets, is prevented. Furthermore, images having excellent color tone and image drawability (reproducibility for fine lines or fine sections in the image) may be obtained.

The amount of liquid droplets that are ejected from the inkjet head is preferably 0.5 to 6 picoliters (pL), more preferably 1 to 5 pL, and even more preferably 2 to 4 pL, from the viewpoint of obtaining high-precision images.

The details of the ink composition that is suitably used in the invention will be described below.

<Treatment Liquid Applying Step>

In the treatment liquid applying step, a treatment liquid containing a wax and water is applied on the image formed in the ink applying step. When the treatment liquid includes a color material, a content of the color material is no greater than 0.1% by mass. Since the treatment liquid contains a wax, the generation of processing flaws occurring when a recorded matter having an image formed thereon is processed, is suppressed, and thus the feel of relief of the images thus formed is suppressed.

There are no particular limitations on the method of applying the treatment liquid, as long as the method is an application method at least capable of applying a desired amount of the treatment liquid on the image. The application may be carried out by adopting a known method such as an inkjet method, a coating method or an immersion method. According to the invention, an inkjet method or a coating method is used with preference, from the viewpoint of the application efficiency.

The details of the inkjet method used in the treatment liquid applying step are as described above.

Furthermore, the coating method may be carried out by a known coating method using a bar coater, an extrusion die coater, an air doctor coater, a blade coater, a rod coater, a knife coater, a squeeze coater, a reverse roll coater or the like.

The amount of application of the treatment liquid may be appropriately selected in accordance with the composition of the treatment liquid or the like. Specifically, for example, the amount of application of the wax may be set at 0.001 to 1.0 g/m$^2$, but from the viewpoint of suppressing the generation of processing flaws and suppressing the feel of relief, the amount of application is preferably 0.005 to 0.5 g/m$^2$, and more preferably 0.01 to 0.1 g/m$^2$.

In regard to the amount of application of the solids fraction in the ink composition, the amount of application of the wax is preferably 0.01% by mass to 10% by mass, and more preferably 0.1% by mass to 1% by mass.

The details of the treatment liquid that is suitably used in the invention will be described below.

Moreover, in regard to the application of the treatment liquid, from the viewpoint of suppressing the generation of processing flaws and suppressing the feel of relief, it is preferable to apply at least one selected from carnauba wax, paraffin wax and polyethylene wax in an amount of application of 0.001 to 1.0 g/m$^2$ in terms of the wax, and it is more preferable to apply at least one selected from carnauba wax, paraffin wax and polyethylene wax in an amount of application of 0.01 to 0.1 g/m$^2$.

It is even more preferable to apply at least one selected from carnauba wax, paraffin wax and polyethylene wax in an amount of application of 0.01% by mass to 10% by mass in terms of the wax, relative to the amount of application of the solids fraction of the ink composition.

<Reaction Liquid Applying Step>

It is preferable for the inkjet image forming method of the invention to further include, in addition to the ink applying step and the treatment liquid applying step, a reaction liquid applying step of applying, on the recording medium, a reaction liquid containing an aggregating component that is capable of forming an aggregate when brought into contact with the ink composition. In this case, the dispersed particles in the ink composition, such as resin particles or color material (for example, pigment) are aggregated, and thus the image is fixed on the recording medium. Thereby, images may be formed with higher precision at higher speed.

The application of the reaction liquid may be carried out by applying a known method such as a coating method, an inkjet method or an immersion method. The coating method may be carried out according to a known coating method using a bar coater, an extrusion die coater, an air doctor coater, a blade coater, a rod coater, a knife coater, a squeeze coater, a reverse roll coater or the like. The details of the inkjet method are as described above.

The reaction liquid applying step may be provided any time before or after the ink applying step that uses the ink composition. According to the invention, an embodiment in which the ink applying step is provided after a reaction liquid is applied in the reaction liquid applying step, is preferred. That is, an embodiment in which a reaction liquid intended for aggregating the color material (preferably, a pigment) in the ink composition is applied in advance on a recording medium before an ink composition is applied, and the ink composition is applied so as to be brought into contact with the aggregating component contained in the reaction liquid applied on the recording medium to thereby achieve image formation, is preferred. Thereby, inkjet recording may be achieved at high speed, and images having high density and high resolution may be obtained even with high speed recording.

There are no particularly limitations on the amount of application of the reaction liquid as long as the reaction liquid is capable of aggregating the ink composition. However, preferably, the amount of application of the reaction liquid may be adjusted such that an amount of application of the aggregating component (for example, a divalent or higher-valent carboxylic acid or a cationic organic compound) of 0.1 g/m$^2$ or greater is achieved. Among others, the amount of application of the reaction liquid is preferably such that the amount of application of the aggregating component is 0.1 to 1.0 g/m$^2$, and more preferably 0.2 to 0.8 g/m$^2$. When the amount of application of the aggregating component is 0.1 g/m$^2$ or greater, the aggregation reaction proceeds more favorably, and when the amount of application is 1.0 g/m$^2$ or less, the degree of glossiness is not excessively increased, and a preferable value is obtained.

The details of the reaction liquid will be described below.

According to the invention, it is preferable to further provide a heating and drying step of heating and drying the reaction liquid on the recording medium, between a time point after the ink applying step is provided after the reaction liquid applying step so as to apply the reaction liquid on the recording medium, and a time point before the ink composition is applied thereon. When the reaction liquid is heated and dried in advance before the ink applying step, ink coloring properties such as the prevention of bleeding may be improved, and visible images having satisfactory color density and satisfactory color tone may be recorded.

The heating and drying process may be carried out by means of a known heating unit such as a heater, an air blowing unit utilizing air blowing, such as a dryer, or a unit combining these. Examples of the heating method include a method of supplying heat with a heater or the like from the side opposite to the side of the recording medium where the reaction liquid has been applied; a method of blowing warm air or hot air to the surface of the recording medium where the reaction liquid has been applied; and a method of heating using an infrared heater, and plural kinds of these heating methods may be used in combination.

<Drying Step and Heat Fixing Step>

It is preferable for the inkjet image forming method of the invention to have, after the ink applying step, and more preferably after the treatment liquid applying step, a drying step of drying the ink image formed by applying the ink composition, and a heat fixing step of fixing the ink image after drying by bringing the image into contact with a heating member. When images are subjected to drying and heat fixing treatments, fixation of images on the recording media is achieved, and the resistance of the images to scratches may be further enhanced.

Heating is preferably carried out at a temperature equal to or higher than the minimum film-forming temperature (MFT) of the resin particles in the image, when the organic solvent contained in the ink composition is allowed to function as a film-forming aid. Since the image is heated to a temperature equal to or higher than the minimum film-forming temperature (MFT), a film is formed, and thus the image is strengthened. The heating temperature is preferably in the temperature range of MFT+10° C. or higher. Specifically, the heating temperature is preferably in the range of 40° C. to 150° C., more preferably in the range of 50° C. to 100° C., and even more preferably in the range of 60° C. to 90° C.

The pressure that is applied together with heating is preferably in the range of 0.1 to 3.0 MPa, more preferably in the range of 0.1 to 1.0 MPa, and even more preferably in the range of 0.1 to 0.5 MPa, from the viewpoint of surface smoothening.

There are no particular limitations on the method of drying, but suitable examples include methods of drying in a non-contact manner, such as a method of heating with a heating body such as a nichrome wire heater or the like; a method of supplying warm air or hot air; and a method of heating with a halogen lamp, an infrared lamp or the like. Furthermore, there are no particular limitations on the method of fixing an image by bringing the image surface into contact with a heating member, but suitable examples include methods of carrying out heating and fixing by contact, such as a method of pressing a hot plate against the image-formed surface of the recording medium; and a method of passing an image between a pair of heating and pressing rollers, between a pair of heating and pressing belts, or between a pair of rollers using a heating and pressing apparatus that is equipped with a heating and pressing belt disposed on the image-recorded surface side of the recording medium, and a retaining roller disposed on the other side of the heating and pressing belt.

In the case of fixing (heating and pressing) an image, the nip time is preferably 1 millisecond to 10 seconds, more preferably 2 milliseconds to 1 second, and more preferably 4 milliseconds to 100 milliseconds. Furthermore, the nip width is preferably 0.1 mm to 100 mm, more preferably 0.5 mm to 50 mm, and more preferably 1 mm to 10 mm.

The heating and pressing roller may be a metallic roller made of a metal, or may be a roller having a core made of a metal, and a coating layer formed of an elastomer and, if necessary, a surface layer (also called as releasable layer) surrounding the metal core. The metal core of the latter may be composed of, for example, a cylinder made of iron, aluminum or SUS, while the surface of the metal core is preferably at least partially covered with the coating layer. Particularly, the coating layer is preferably formed of a silicone resin or a fluororesin, which has mold releasability. It is also preferable that the metal core in one of the heating and pressing rollers have a heating body mounted inside, and the recording medium may be heated by passing the recording medium between rollers, by simultaneously subjecting the recording medium to a heat treatment and a pressing treatment, or if necessary, by placing the recording medium between two heating rollers. Preferable examples of the heating body include a halogen lamp heater, a ceramic heater, and a nichrome wire.

The belt substrate that constitutes the heating and pressing belt used in the heating and pressing apparatus is preferably seamless nickel-plated brass, and the thickness of the substrate is preferably 10 to 100 µm. As the material of the belt substrate, aluminum, iron, polyethylene and the like may also be used in addition to nickel. When a silicone resin or a fluororesin is provided, the thickness of the layer formed by using these resins is preferably 1 to 50 µm, and more preferably 10 to 30 µm.

Furthermore, in order to achieve the aforementioned pressure (nip pressure), for example, an elastic member such as a spring having tension may be selected and installed at both ends of the roller such as a heating and pressing roller, with the nip interval taken into consideration, so as to obtain a desired nip pressure.

The conveying speed of the recording medium in the case of using a heating and pressing roller or a heating and pressing belt, is preferably in the range of 200 to 700 mm/second, more preferably 300 to 650 mm/second, and even more preferably 400 to 600 mm/second.

[Recording Medium]

The inkjet image forming method of the invention is intended to record an image on a recording medium. There are no particular limitations on the recording medium, but general printing paper composed mainly of cellulose, such as so-called high quality paper, coated paper or art paper, which is used in general offset printing or the like, may be used. The general printing paper composed mainly of cellulose is such that the absorption and drying of ink occurs relatively slowly as compared with the image formation according to a general inkjet method using an aqueous ink, migration of the color material is prone to occur after droplet ejection, and the image quality is easily lowered. However, according to the inkjet image forming method of the invention, migration of the color material is suppressed, and recording of high quality images having excellent color density and color tone is made possible.

In regard to the recording medium, any recording medium that is commercially available in general may be used, and examples include high quality paper (A) such as "OK PRINCE HIGH QUALITY" (trade name, manufactured by Oji Paper Co., Ltd.), "SHIORAI" (trade name, manufactured by Nippon Paper Industries Co., Ltd.), and "NEW NPI HIGH QUALITY" (trade name, manufactured by Nippon Paper Industries Co., Ltd.); finely coated paper such as "OK EVER LIGHT COAT" (trade name, manufactured by Oji Paper Co., Ltd.) and "AURORA S" (trade name, manufactured by Nippon Paper Industries Co., Ltd.); lightweight coated paper (A3) such as "OK COAT L" (trade name, manufactured by Oji Paper Co., Ltd.) and "AURORA L" (trade name, manufactured by Nippon Paper Industries Co., Ltd.); coated paper (A2, B2) such as "OK TOPCOAT +" (trade name, manufactured by Oji Paper Co., Ltd.) and "AURORA COAT" (trade name, manufactured by Nippon Paper Industries Co., Ltd.); and art paper (A1) such as "OK KINFUJI +" (trade name, manufactured by Oji Paper Co., Ltd.) and "TOKUBISHI ART" (trade name, manufactured by Mitsubishi Paper Mills, Ltd.). Various papers exclusive for photographic use intended for inkjet recording may also be used.

Among those mentioned above, from the viewpoint of having a high suppressive effect for the migration of the color material and obtaining high quality images having equally or more satisfactory color density and color tone than the conventional ones, the recording medium is preferably a recording medium having an absorption coefficient of water, Ka, of 0.05 to 0.5 mL/m$^2$·ms$^{1/2}$, and more preferably a recording medium having an absorption coefficient of water of 0.1 to 0.4 mL/m$^2$·ms$^{1/2}$, and even more preferably a recording medium having an absorption coefficient of water of 0.2 to 0.3 mL/m$^2$·ms$^{1/2}$.

The absorption coefficient of water, Ka, has the same meaning as described in JAPAN TAPPI Paper and Pulp Test Method No. 51:2000 (issued by Japan Technical Association of the Pulp and Paper Industry). Specifically, the absorption coefficient Ka is calculated from the difference between the amounts of manual transfer of water obtainable at a contact time of 100 ms and a contact time of 900 ms, each measured using an automatic scanning liquid absorptiometer (trade name: KM500WIN, manufactured by Kumagai Riki Kogyo Co., Ltd.).

Among the recording media, a so-called coated paper which is used in general offset printing or the like, is preferable. The coated paper is a paper produced by providing a coating layer by applying a coating material on the surface of high quality paper or neutral paper, which is composed mainly of cellulose and is generally non-surface-treated. Coated papers are prone to cause problems in terms of quality, such as the gloss or abrasion resistance of the images. However, according to the inkjet image forming method of the invention, the occurrence of gloss unevenness may be suppressed, and images having satisfactory glossiness and abrasion resistance may be obtained. Particularly, it is preferable to use a coated paper having a base paper and a coating layer which is provided on the base paper and contains at least one of kaolin and calcium bicarbonate. More specifically, an art paper, a coated paper, a lightweight coated paper, or a finely coated paper is preferred.

[Ink Composition]

The ink composition used in the invention is constituted to include at least one color material and water, and to include, if necessary, a water-soluble organic solvent, resin particles and other additives.

(Color Material)

The ink composition of the invention contains at least one color material. As the color material, known dyes, pigments and the like may be used without any particular limitations. Among them, the color material is preferably a color material that is almost insoluble in water or sparingly soluble in water from the viewpoint of ink colorability. Specific examples include various pigments, disperse dyes, oil-soluble dyes, and colorants capable of forming J-associates, and the color material is more preferably a pigment.

According to the invention, a water-insoluble pigment itself or a pigment itself having the surface treated with a dispersant may be used as the color material.

According to the invention, there are no particular limitations on the pigment in terms of its type, and conventionally known organic and inorganic pigments may be used. Examples thereof include polycyclic pigments such as azo lakes, azo pigments, phthalocyanine pigments, perylene and perinone pigments, anthraquinone pigments, quinacridone pigments, dioxazine pigments, diketopyrrolopyrrole pigments, thioindigo pigments, isoindolinone pigments, and quinophthalone pigments; dye lakes such as basic dye lakes and acidic dye lakes; organic pigments such as nitro pigments, nitroso pigments, aniline black, and daylight fluorescent pigments; and inorganic pigments such as titanium oxide, iron oxide series, and carbon black series. Furthermore, any pigment that is not described in the Color Index may also be used as long as the pigment is dispersible in an aqueous phase. The pigments described above which have been surface-treated with a surfactant or a polymeric dispersant, or graft carbon and the like may also be used. Among the pigments mentioned above, it is particularly preferable to use an azo pigment, a phthalocyanine pigment, an anthraquinone pigment, a quinacridone pigment, or a carbon black-based pigment.

Specific examples of the pigment that may be used in the invention include those pigments described in paragraph [0142] to paragraph [0145] of JP-A No. 2007-100071.

—Dispersant—

The dispersant may be a polymeric dispersant or a low molecular weight surfactant type dispersant. Furthermore, the polymeric dispersant may be any of a water-soluble dispersant or a non-water-soluble dispersant. Here, the non-water-soluble dispersant refers to a dispersant which gives an amount of dissolution of 10 g or less when dried at 105° C. for 2 hours and then dissolved in 100 g of water at 25° C.

The low molecular weight surfactant type dispersant (hereinafter, may be referred to as "low molecular weight dispersant") may be added for the purpose of stably dispersing the organic pigment in an aqueous solvent while maintaining the viscosity of the ink at a low level. The low molecular weight dispersant used herein is a low molecular weight dispersant having a molecular weight of 2000 or less. Furthermore, the molecular weight of the low molecular weight dispersant is preferably 100 to 2000, and more preferably 200 to 2000.

The low molecular weight dispersant has a structure which includes a hydrophilic group and a hydrophobic group. The hydrophilic group and the hydrophobic group may be such that one or more of each group are independently included in one molecule, and plural kinds of hydrophilic groups and hydrophobic groups may be carried by a dispersant molecule. The dispersant may also have an appropriate linking group for linking the hydrophilic group and the hydrophobic group.

Examples of the hydrophilic group include an anionic group, a cationic group, a nonionic group, and a betaine type group combining these.

There are no particular limitations on the anionic group as long as the group has a negative charge, and the anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and even more preferably a carboxylic acid group.

There are no particular limitations on the cationic group as long as the group has a positive charge, and the cationic group is preferably an organic cationic substituent, more preferably a cationic group containing nitrogen or phosphorus, and even more preferably a cationic group containing nitrogen. Among them, a pyridinium cation or an ammonium cation is particularly preferred.

There are no particular limitations on the nonionic group as long as the group has neither a negative charge nor a positive charge, and examples thereof include polyalkylene oxide, polyglycerin, and some of sugar units.

According to the invention, the hydrophilic group of the low molecular weight dispersant is preferably an anionic group, from the viewpoint of the dispersion stability and aggregatability of the pigment.

When the low molecular weight dispersant has an anionic hydrophilic group, the pKa of the low molecular weight dispersant is preferably 3 or greater, from the viewpoint of accelerating the aggregation reaction by bringing the dispersant into contact with an acidic reaction liquid. The pKa of the low molecular weight dispersant is a value experimentally determined from a titration curve obtained by titrating a liquid having the low molecular weight dispersant dissolved in a solution of tetrahydrofuran-water=3:2 (V/V) at a concentration of 1 mmol/L, with an acid or alkali aqueous solution.

On the other hand, the hydrophobic group may have any of a hydrocarbon-based structure, a fluorocarbon-based structure and a silicone-based structure, but a hydrophobic group having a hydrocarbon-based structure is particularly preferred. Furthermore, such a hydrophobic group may have a linear structure or a branched structure. The hydrophobic group may have a structure having a single chain or a structure having two or more chains. In the case of a structure having two or more chains, the dispersant may have plural kinds of hydrophobic groups.

The hydrophobic group is preferably a hydrocarbon group having 2 to 24 carbon atoms, more preferably a hydrocarbon group having 4 to 24 carbon atoms, and even more preferably a hydrocarbon group having 6 to 20 carbon atoms.

Among polymeric dispersants, a hydrophilic polymer compound may be used as the water-soluble dispersant. Examples of a naturally occurring hydrophilic polymer compound include plant polymers such as gum arabic, tragacanth gum, guar gum, karaya gum, locust bean gum, arabinogalactone, pectin, and quince seed starch; seaweed-based polymers such as alginic acid, carrageenan and agar; animal polymers such as gelatin, casein, albumin, and collagen; and microbial polymers such as xanthene gum and dextran.

Examples of a hydrophilic polymer compound obtained by chemically modifying a natural product as a raw material, include cellulosic polymers such as methylcellulose, ethylcellulose, hydroxyethylcellulose, hydroxypropylcellulose and carboxymethylcelluose; starch-based polymers such as sodium starch glycolate and sodium starch phosphate ester; and seaweed-based polymers such as alginic acid propylene glycol esters.

Furthermore, examples of a synthetic water-soluble polymer compound include vinylic polymers such as polyvinyl alcohol, polyvinylpyrrolidone, and polyvinyl methyl ether; acrylic resins such as polyacrylamide, polyacrylic acid or alkali metal salts thereof, and water-soluble styrene acrylic resins; water-soluble styrene-maleic acid resins, water-soluble vinylnaphthalene-acrylic resins, water-soluble vinylnaphthalene-maleic acid resins, polyvinylpyrrolidone, polyvinyl alcohol, alkali metal salts of a β-naphthalenesulfonic acid-formalin condensate, and polymer compounds having, in a side chain, a salt of a cationic functional group such as a quaternary ammonium or an amino group.

Among these, from the viewpoint of the dispersion stability and aggregatability of the pigment, a polymer compound containing a carboxyl group is preferred, and for example, acrylic resins such as a water-soluble styrene acrylic resin, and polymer compounds containing a carboxylic group, such as a water-soluble styrene-maleic acid resin, a water-soluble vinylnaphthalene-acrylic resin, and a water-soluble vinylnaphthalene-maleic acid resin are particularly preferred.

As the non-water-soluble dispersant among the polymer compounds (polymeric dispersants), a polymer having both a hydrophobic portion and a hydrophilic portion may be used. Examples of the polymer include a styrene-(meth)acrylic acid copolymer, a styrene-(meth)acrylic acid-(meth)acrylic acid ester copolymer, a (meth)acrylic acid ester-(meth) acrylic acid copolymer, a polyethylene glycol(meth)acrylate-(meth)acrylic acid copolymer, and a styrene-maleic acid copolymer.

The weight average molecular weight of the polymeric dispersant is preferably 3,000 to 200,000, more preferably 5,000 to 100,000, even more preferably 5,000 to 80,000, and particularly preferably 10,000 to 60,000.

The mixing mass ratio of the pigment to the dispersant (pigment:dispersant) is preferably in the range of 1:0.06 to 1:3, more preferably in the range of 1:0.125 to 1:2, and even more preferably 1:0.125 to 1:1.5.

According to the invention, in the case of using a dye as a color material, for example, a color material having a dye supported on a water-insoluble carrier may be used as water-insoluble colorant particles. Regarding the dye, known dyes may be used without any particular limitations, and for example, the dyes described in JP-A No. 2001-115066, JP-A No. 2001-335714, JP-A No. 2002-249677 and the like may be used. Furthermore, there are no particular limitations on the carrier as long as the carrier is insoluble in water or sparingly soluble in water, and any of an inorganic material, an organic material and a composite material of these may be used. Specifically, the carriers described in JP-A No. 2001-181549, JP-A No. 2007-169418 and the like may also be suitably used in the invention.

The carrier retaining a dye (water-insoluble colorant particles) may be used as an aqueous dispersion using a dispersant. As the dispersant, the dispersants mentioned above may be suitably used.

From the viewpoint of abrasion resistance and aggregatability, it is preferable that the color material according to the invention contain a pigment and a dispersant, it is more preferable that the color material contain an organic pigment and a polymeric dispersant, and it is particularly preferable that the color material contain an organic pigment and a polymeric dispersant containing a carboxyl group.

Furthermore, from the viewpoint of aggregatability, the pigment is preferably water-insoluble as a result of having at least a part of the pigment surface coated with a polymeric dispersant having a carboxyl group.

Moreover, according to the invention, from the viewpoint of aggregatability, it is preferable that the acid value of the resin particles that will be described below be smaller than the acid value of the polymeric dispersant.

The average particle size of the color material (preferably, a pigment) is preferably 10 to 200 nm, more preferably 10 to 150 nm, and even more preferably 10 to 100 nm. When the average particle size is 200 nm or less, the color reproducibility is improved, and the droplet ejection properties exhibited when droplet ejection is implemented by an inkjet method are improved. When the average particle size is 10 nm or greater, light fastness is improved. Furthermore, there are no particular limitations on the particle size distribution of the color material, and the particle size distribution may be any of a broad particle size distribution or a monodisperse particle size distribution. Furthermore, two or more kinds of color materials having a monodisperse particle size distribution may be used in mixture.

The average particle size and particle size distribution of the polymer particles are determined by a dynamic light scattering method using a NanoTrac particle size distribution analyzer (trade name: UPA-EX150, manufactured by Nikkiso Co., Ltd.).

The color material may be used such that only one kind may be used alone, or two or more kinds may be used in combination.

The content of the color material in the ink composition is preferably 1% by mass to 25% by mass, more preferably 2% by mass to 20% by mass, even more preferably 5% by mass to 20% by mass, and particularly preferably 5% by mass to 15% by mass, based on the ink composition, from the viewpoint of the image density.

(Water-Soluble Organic Solvent)

It is preferable that the ink composition according to the invention further contain at least one water-soluble organic solvent, in addition to water. When the ink composition contains a water-soluble organic solvent together with the resin particles that will be described below, the minimum film forming temperature of the resin particles may be maintained low in the ink composition, and ejectability and the like may be maintained satisfactory. In addition, according to the invention, the term water-soluble means that the subject substance is dissolved in water at 20° C. in an amount of 1% by mass or more.

The water-soluble organic solvent that constitutes the ink composition is preferably an alkyleneoxy alcohol or an alkyleneoxy alkyl ether, from the viewpoint of preventing the curling of the printed matter in a highly humid environment.

The alkyleneoxy alcohol is preferably propyleneoxy alcohol. Examples of propyleneoxy alcohol include SUNNIX GP-250 and SUNNIX GP-400 (trade names, manufactured by Sanyo Chemical Industries, Ltd.).

The alkyleneoxy alkyl ether is preferably an ethyleneoxy alkyl ether having an alkyl moiety having 1 to 4 carbon atoms, or a propyleneoxy alkyl ether having an alkyl moiety having 1 to 4 carbon atoms. Examples of the alkyleneoxy alkyl ether include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glcyol monomethyl ether, ethylene glycol diacetate, ethylene glycol monomethyl ether acetate, triethylene glycol monomethyl ether, triethylene glycol monoethyl ether, and ethylene glycol monophenyl ether.

According to the invention, it is preferable that the polymer particles be self-dispersing polymer particles, and the water-soluble organic solvent be propyleneoxy alcohol and ethyleneoxy alkyl ether (the alkyl moiety having 1 to 4 carbon atoms) and/or propyleneoxy alkyl ether (the alkyl moiety having 1 to 4 carbon atoms); and it is more preferable that the polymer particles be self-dispersing polymer particles containing a water-insoluble polymer including a water-soluble constituent unit and a constituent unit derived from an aromatic group-containing monomer, and the water-soluble organic solvent be propyleneoxy alcohol and ethyleneoxy alkyl ether (the alkyl moiety having 1 to 4 carbon atoms) and/or propyleneoxy alkyl ether (the alkyl moiety, having 1 to 4 carbon atoms).

Furthermore, the ink composition may further contain, as necessary, another organic solvent in addition to the water-soluble organic solvent, for the purpose of promoting the prevention of drying, acceleration of penetration, adjustment of viscosity and the like.

In the case of using the organic solvent as a drying preventing agent, when an image is recorded by ejecting the ink composition by an inkjet method, the clogging of nozzles that may occur as a result of drying of the ink at the ink ejection port, may be effectively prevented.

For the prevention of drying, a water-soluble organic solvent having a vapor pressure that is lower than that of water, is preferred. Specific examples of the water-soluble organic solvent that is suitable for the prevention of drying include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; polyfunctional compounds such as diacetone alcohol and diethanolamine; and urea derivatives. Among them, polyhydric alcohols such as glycerin and diethylene glycol are preferred.

Furthermore, an organic solvent may be used for the purpose of allowing the ink composition to penetrate thoroughly into the recording medium. Specific examples of the organic solvent that is suitable for the acceleration of penetration include alcohols such as ethanol, isopropanol, butanol and 1,2-hexanediol. Furthermore, sodium lauryl sulfate, sodium oleate or a nonionic surfactant may also be included in order to accelerate penetration.

The water-soluble organic solvent may be used for the adjustment of viscosity, in addition to the purposes described above. Specific examples of the water-soluble organic solvent that may be used for the adjustment of viscosity include alcohols (for example, methanol, ethanol and propanol), amines (for example, ethanolamine, diethanolamine, triethanolamine, ethylenediamine and diethylenetriamine) and other polar solvents (for example, formamide, N,N-dimethylformamide, N,N-dimethylacetamide, dimethyl sulfoxide, sulfolane, 2-pyrrolidone acetonitrile and acetone).

The ink composition contains water, but there are no particular limitations on the amount of water. Inter alia, the content of water is preferably 10% by mass to 99% by mass, more preferably 30% by mass to 80% by mass, and even more preferably 50% by mass to 70% by mass.

(Resin Particles)

From the viewpoint of fixability, abrasion resistance and aggregatability, it is preferable that the ink composition contain at least one kind of resin particles, and it is more preferable that the resin particles be self-dispersing polymer particles.

The self-dispersing polymer according to the invention refers to a water-insoluble polymer which may be brought to a dispersed state in an aqueous medium by the functional group (particularly, an acidic group or a salt thereof) carried by the polymer itself when brought to a dispersed state by a reverse phase emulsification method in the absence of a surfactant.

Here, the term dispersed state is meant to include both an emulsified state (emulsion) in which the water-insoluble polymer is dispersed in a liquid state in an aqueous medium, and a dispersed state (suspension) in which the water-insoluble polymer is dispersed in a solid state in an aqueous medium.

The self-dispersing polymer according to the invention is preferably a self-dispersing polymer that is capable of being brought to a dispersed state in which the water-insoluble polymer is dispersed in a solid state, from the viewpoint of the ink fixability exhibited when the self-dispersing polymer is contained in the ink composition.

A reverse phase emulsification method may be used as the method for preparing an emulsified or dispersed state of a self-dispersing polymer, that is, an aqueous dispersion of a self-dispersing polymer. An example of the reverse phase emulsification method may be a method of dissolving or dispersing a self-dispersing polymer in a solvent (for example, a hydrophilic organic solvent), subsequently introducing the solution or dispersion directly into water without adding a surfactant thereto, stirring and mixing the mixture while keeping the salt-forming group (for example, an acidic group) carried by the self-dispersing polymer in a neutralized state, to thereby remove the solvent, and then obtaining an aqueous dispersion that has been brought to an emulsified or dispersed state.

A stable emulsified or dispersed state for the self-dispersing polymer of the invention means a state in which, even after a solution prepared by dissolving 30 g of a water-insoluble polymer in 70 g of an organic solvent (for example, methyl ethyl ketone), a neutralizing agent capable of neutralizing 100% of the salt-forming group of the water-insoluble polymer (if the salt-forming group is anionic, the neutralizing agent is sodium hydroxide; and if cationic, acetic acid), and 200 g of water are mixed and stirred (apparatus: stirring blade-equipped stirring apparatus, speed of rotation 200 rpm, for 30 minutes, 25° C.), and then the organic solvent is removed from the mixed liquid, the emulsified state or dispersed state is maintained stable for at least one week at 25° C., and the occurrence of precipitates cannot be verified by visual inspection.

Furthermore, the stability of the emulsified or dispersed state for the self-dispersing polymer may also be confirmed by a sedimentation accelerating test by centrifugation. The stability based on a sedimentation acceleration test by centrifugation may be evaluated by, for example, adjusting an aqueous dispersion of the polymer particles obtained by the method described above to a solids concentration of 25% by mass, subsequently centrifuging the aqueous dispersion at 12000 rpm for one hour, and measuring the solids concentration of the supernatant obtained after centrifugation.

When the ratio of the solids concentration measured after centrifugation to the solids concentration measured before centrifugation is large (if the value is close to 1), it means that the sedimentation of the polymer particles resulting from centrifugation does not occur, that is, the aqueous dispersion of the polymer particles is more stable. According to the invention, the ratio of the solids concentration measured after centrifugation to the solids concentration measured before centrifugation is preferably 0.8 or greater, more preferably 0.9 or greater, and particularly preferably 0.95 or greater.

The water-insoluble polymer means a polymer which gives an amount of dissolution of 10 g or less when the polymer is dried at 105° C. for 2 hours and then dissolved in 100 g of water at 25° C., and the amount of dissolution is preferably 5 g or less, and more preferably 1 g or less. The amount of dissolution is the amount of dissolution obtained when the water-insoluble polymer is 100% neutralized with sodium hydroxide or acetic acid in accordance with the type of the salt-forming group of the polymer.

The self-dispersing polymer according to the invention is such that the content of the water-soluble component which exhibits water-solubility when brought to a dispersed state is preferably 10% by mass or less, more preferably 8% by mass or less, and even more preferably 6% by mass or less. When the content of the water-soluble component is 10% by mass or less, swelling of the polymer particles or fusion between the polymer particles is effectively suppressed, and a more stable dispersed state may be maintained. Furthermore, an increase in the viscosity of the ink composition may be suppressed, so that, for example, in the case of applying the ink composition by an inkjet method, the ejection stability is further improved.

Here, the water-soluble component refers to a compound which is contained in the self-dispersing polymer and which is dissolved in water when the self-dispersing polymer is brought to a dispersed state. The water-soluble component is a water-soluble compound that is side-produced or incorporated during the preparation of the self-dispersing polymer.

The self-dispersing polymer according to the invention includes at least one hydrophilic constituent unit derived from a hydrophilic monomer and at least one hydrophobic constituent unit derived from a hydrophobic monomer. There are no particular limitations on the main chain skeleton of the self-dispersing polymer, but from the viewpoint of the dispersion stability of the polymer particles, the main chain is preferably a vinyl polymer, and preferably a (meth)acrylic polymer. Here, the (meth)acrylic polymer means a polymer including at least one of a constituent unit derived from a methacrylic acid derivative and a constituent unit derived from an acrylic acid derivative.

—Hydrophilic Constituent Unit—

There are no particular limitations on the hydrophilic constituent unit in the self-dispersing polymer as long as the hydrophilic constituent unit is derived from a hydrophilic group-containing monomer (hydrophilic monomer), and the hydrophilic constituent unit may be derived from one kind of hydrophilic group-containing monomer or may be derived from two or more kinds of hydrophilic group-containing monomers. There are no particular limitations on the hydrophilic group, and the hydrophilic group may be a dissociable group or may be a nonionic hydrophilic group.

The hydrophilic group is such that at least one kind is preferably a dissociable group, and more preferably an anionic dissociable group from the view point of the self-dispersion promotion and the stability of the emulsified or dispersed state. Examples of the anionic dissociable group include a carboxyl group, a phosphoric acid group and a sulfonic acid group. Among them, from the viewpoint of the fixability required when an ink composition is constituted, a carboxyl group is particularly preferred.

From the viewpoint of self-dispersibility, the hydrophilic group-containing monomer is preferably a dissociable group-containing monomer, and is preferably a dissociable group-containing monomer having a dissociable group and an ethylenically unsaturated bond.

Examples of the dissociable group-containing monomer include an unsaturated carboxylic acid monomer, an unsaturated sulfonic acid monomer and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid. Specific examples of the unsaturated sulfonic acid monomer include styrenesulfonic acid, 2-acrylamide-2-methylpropanesulfonic acid, 3-sulfopropyl(meth)acrylate, and bis(3-sulfopropyl)-itaconic acid ester. Specific examples of the unsaturated phosphoric acid monomer include vinylphosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the above-mentioned dissociable group-containing monomers, an unsaturated carboxylic acid monomer is preferred from the viewpoint of dispersion stability and ejection stability, and at least one of acrylic acid and methacrylic acid is more preferred.

Furthermore, examples of the monomer having a nonionic hydrophilic group include ethylenically unsaturated monomers containing a (poly)ethyleneoxy group or a polypropyleneoxy group, such as 2-methoxyethyl acrylate, 2-(2-methoxyethoxy)ethyl acrylate, 2-(2-methoxyethoxy)ethyl methacrylate, ethoxytriethylene glycol methacrylate, methoxypolyethylene glycol (molecular weight 200 to 1000) monomethacrylate, and polyethylene glycol (molecular weight 200 to 1000) monomethacrylate; and ethylenically unsaturated monomers having a hydroxyl group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate and hydroxyhexyl(meth)acrylate.

The monomer having a nonionic hydrophilic group is preferably an ethylenically unsaturated monomer having an alkyl ether at the end, rather than an ethylenically unsaturated monomer having a hydroxyl group at the end, from the viewpoint of the stability of particles and the content of the water-soluble component.

The hydrophilic constituent unit in the self-dispersing polymer is preferably any of an embodiment containing only a hydrophilic constituent unit having an anionic dissociable group, and an embodiment containing both a hydrophilic constituent unit having an anionic dissociable group and a hydrophilic constituent unit having a nonionic dissociable group.

Furthermore, an embodiment containing two or more kinds of hydrophilic constituent units having an anionic dissociable group, or an embodiment using two or more kinds of hydrophilic constituent units having an anionic dissociable group and hydrophilic constituent units having a nonionic hydrophilic group in combination, is also preferable.

The content ratio of the hydrophilic constituent unit in the self-dispersing polymer is preferably 25% by mass or less, more preferably 1% by mass to 25% by mass, even more preferably 2% by mass to 23% by mass, and particularly preferably 4% by mass to 20% by mass, from the viewpoint of the viscosity and the stability over time.

When the self-dispersing polymer has two or more kinds of hydrophilic constituent units, the total content ratio of the hydrophilic constituent units is preferably in the range described above.

The content of the hydrophilic constituent unit having an anionic dissociable group in the self-dispersing polymer is preferably in the range such that the acid value falls in a suitable range that will be described below.

Furthermore, the content of the constituent unit having a nonionic hydrophilic group is preferably 0% by mass to 25% by mass, more preferably 0% by mass to 20% by mass, and particularly preferably 0% by mass to 15% by mass, from the viewpoint of the ejection stability and the stability over time.

When the self-dispersing polymer has an anionic dissociable group, the acid value (KOH mg/g) is preferably from 20 to 200, more preferably from 22 to 120, and particularly more preferably from 25 to 100, from the viewpoint of the self-dispersibility, the content of the water-soluble component, and the fixability required when an ink composition is constituted. The acid value is particularly preferably from 30 to 80. When the acid value is 20 or greater, the particles may be dispersed in a more stable manner, and when the acid value is 200 or less, the proportion of the water-soluble component may be reduced.

—Hydrophobic Constituent Unit—

There are no particular limitations on the hydrophobic constituent unit in the self-dispersing polymer as long as the hydrophobic constituent unit is derived from a hydrophobic group-containing monomer (hydrophobic monomer), and the hydrophobic constituent unit may be derived from one kind of hydrophobic group-containing monomer or may be derived from two or more kinds of hydrophobic group-containing monomers. There are no particular limitations on the hydrophobic group, and the hydrophobic group may be any of a chain-like aliphatic group, a cyclic aliphatic group, and an aromatic group.

The hydrophobic monomer is preferably such that at least one is a cyclic aliphatic group-containing monomer from the viewpoint of the anti-blocking property, abrasion resistance and dispersion stability, and is more preferably a cyclic aliphatic group-containing (meth)acrylate (hereinafter, may be referred to as "alicyclic(meth)acrylate").

—Alicyclic(meth)acrylate—

The alicyclic(meth)acrylate is a compound which includes a structural moiety derived from (meth)acrylic acid and a structural moiety derived from an alcohol, and has a structure containing at least one unsubstituted or substituted alicyclic hydrocarbon group (cyclic aliphatic group) in the structural moiety derived from an alcohol. In addition, the alicyclic hydrocarbon group may be the structural moiety derived from an alcohol per se, or may be linked to the structural moiety derived from an alcohol via a linking group.

Furthermore, the "alicyclic(meth)acrylate" means a methacrylate or acrylate having an alicyclic hydrocarbon group.

There are no particular limitations on the alicyclic hydrocarbon group as long as the alicyclic hydrocarbon group includes a cyclic non-aromatic hydrocarbon group, and examples of the alicyclic hydrocarbon group include a monocyclic hydrocarbon group, a bicyclic hydrocarbon group and a polycyclic hydrocarbon group having three or more rings.

Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, and a bicyclo[4.3.0]nonane.

The alicyclic hydrocarbon group may further have a substituent. Examples of the substituent include an alkyl group, an alkenyl group, an aryl group, an aralkyl group, an alkoxy group, a hydroxyl group, a primary amino group, a secondary amino group, a tertiary amino group, an alkyl- or arylcarbonyl group, and a cyano group.

The alicyclic hydrocarbon group may further form a fused ring.

The alicyclic hydrocarbon group according to the invention is preferably such that the alicyclic hydrocarbon group moiety has 5 to 20 carbon atoms from the viewpoint of the viscosity or solubility.

Suitable examples of the linking group that links the alicyclic hydrocarbon group and the structural moiety derived from an alcohol include an alkylene group, an alkenylene group, an alkynylene group, an arylalkylene group, an alkyleneoxy group, a mono- or oligoethyleneoxy group, and a mono- or oligopropyleneoxy group, which all have 1 to 20 carbon atoms.

Specific examples of the alicyclic(meth)acrylate according to the invention will be described below, but the invention is not intended to be limited to these.

Examples of monocyclic(meth)acrylate include cycloalkyl(meth)acrylates having a cycloalkyl group having 3 to 10 carbon atoms, such as cyclopropyl(meth)acrylate, cyclobutyl(meth)acrylate, cyclopentyl(meth)acrylate, cyclohexyl(meth)acrylate, cycloheptyl(meth)acrylate, cyclooctyl(meth)acrylate, cyclononyl(meth)acrylate and cyclodecyl(meth)acrylate.

Examples of bicyclic(meth)acrylate include isobornyl(meth)acrylate and norbornyl(meth)acrylate.

Examples of tricyclic(meth)acrylate include adamantyl(meth)acrylate, dicyclopentanyl(meth)acrylate, and dicyclopentenyloxyethyl(meth)acrylate.

These may be used singly or as mixtures of two or more kinds.

Among these, from the viewpoint of the dispersion stability of the self-dispersing polymer particles, fixability and anti-blocking property, it is preferable that the alicyclic(meth)acrylate is at least one of bicyclic(meth)acrylate or polycyclic(meth)acrylate having three or more rings, and the alicyclic(meth)acrylate is more preferably at least one selected from isobornyl(meth)acrylate, adamantyl(meth)acrylate and dicyclopentanyl(meth)acrylate.

According to the invention, the content ratio of the constituent unit derived from an alicyclic(meth)acrylate contained in the self-dispersing polymer particles is preferably from 20% by mass to 90% by mass, and more preferably from 40% by mass to 90% by mass, from the viewpoint of the stability of the self-dispersed state, stabilization of the particle shape in an aqueous medium under the effect of the hydrophobic interaction between alicyclic hydrocarbon groups, and a decrease in the amount of the water-soluble component due to appropriate hydrophobization of the particles. The content ratio is particularly preferably from 50% by mass to 80% by mass.

When the content of the constituent unit derived from alicyclic(meth)acrylate is 20% by mass or greater, the fixability and anti-blocking property may be ameliorated. On the other hand, when the constituent unit derived from alicyclic(meth)acrylate is 90% by mass or less, the stability of the polymer particles is enhanced.

The self-dispersing polymer according to the invention may be constituted to further include another constituent unit if necessary, as the hydrophobic constituent unit, in addition to the constituent unit derived from alicyclic(meth)acrylate. There are no particular limitations on the monomer that forms the other constituent unit, as long as the monomer is a monomer that may be copolymerized with the alicyclic(meth)acrylate and the hydrophilic group-containing monomer mentioned above, and any known monomer may be used.

Specific examples of the monomer that forms the other constituent unit (hereinafter, may be referred to as "other copolymerizable monomer") include an alkyl(meth)acrylate such as methyl(meth)acrylate, ethyl(meth)acrylate, isopropyl(meth)acrylate, n-propyl(meth)acrylate, n-butyl(meth)acrylate, isobutyl(meth)acrylate, t-butyl(meth)acrylate, hexyl(meth)acrylate, or ethylhexyl(meth)acrylate; an aromatic ring-containing (meth)acrylate such as benzyl(meth)acrylate or phenoxyethyl(meth)acrylate; a styrene such as styrene, α-methylstyrene or chlorostyrene; a dialkylaminoalkyl(meth)acrylate such as dimethylaminoethyl(meth)acrylate; an N-hydroxyalkyl(meth)acrylamide such as N-hydroxymethyl(meth)acrylamide, N-hydroxyethyl(meth)acrylamide, or N-hydroxybutyl(meth)acrylamide; and (meth)acrylamides, such as an N-alkoxyalkyl(meth)acrylamide such as N-methoxymethyl(meth)acrylamide, N-ethoxymethyl(meth)acrylamide, N-(n-, iso-) butoxymethyl(meth)acrylamide, N-methoxyethyl(meth)acrylamide, N-ethoxyethyl(meth)acrylamide, or N-(n-, iso-)butoxyethyl(meth)acrylamide.

Among them, from the viewpoint of the flexibility of the polymer skeleton or the ease of control of the glass transition temperature (Tg), and from the viewpoint of the dispersion stability of the self-dispersing polymer, the monomer that forms the other constituent unit is preferably at least one (meth)acrylate containing a chain-like alkyl group having 1 to 8 carbon atoms, more preferably a (meth)acrylate having a chain-like alkyl group having 1 to 4 carbon atoms, and particularly preferably methyl(meth)acrylate or ethyl(meth)acrylate. Here, the chain-like alkyl group refers to an alkyl group having a straight chain or a branched chain.

Furthermore, according to the invention, a (meth)acrylate containing an aromatic group may also be used with preference.

When an aromatic-containing (meth)acrylate is included as the other copolymerizable monomer, from the viewpoint of the dispersion stability of the self-dispersing polymer particles, the proportion of the constituent unit derived from an aromatic-containing (meth)acrylate is preferably 40% by mass or less, more preferably 30% by mass or less, and particularly preferably 20% by mass or less.

Furthermore, in the case of using a styrene-based monomer as the other copolymerizable monomer, from the viewpoint of the stability when the polymer is made into the self-dispersing polymer particles, the proportion of the constituent unit derived from the styrene-based monomer is preferably 20% by mass or less, more preferably 10% by mass or less, and even more preferably 5% by mass or less, and it is particularly preferable that the self-dispersing polymer do not include a constituent unit derived from a styrene-based monomer.

Here, the styrene-based monomer refers to styrene, substituted styrene (α-methylstyrene, chlorostyrene, or the like), and a styrene macromer having a polystyrene structural unit.

For the self-dispersing polymer, the other copolymerizable monomer may be used singly, or two or more kinds may be used in combination.

When the self-dispersing polymer includes another constituent unit, the content is preferably 10% by mass to 80% by mass, more preferably 15% by mass to 75% by mass, and particularly preferably 20% by mass to 70% by mass. When two or more kinds of the monomers that form the other constituent unit are used in combination, the total content is preferably in the range described above.

From the viewpoint of the dispersion stability, the self-dispersing polymer according to the invention is preferably a polymer obtainable by polymerizing at least three kinds of monomers such as an alicyclic(meth)acrylate, another copolymerizable monomer, and a hydrophilic group-containing monomer, and is more preferably a polymer obtainable by polymerizing at least three kinds of monomers such as an alicyclic(meth)acrylate, an alkyl group-containing (meth)acrylate having a linear or branched chain having 1 to 8 carbon atoms, and a hydrophilic group-containing monomer.

According to the invention, in regard to the content of the (meth)acrylate having a linear or branched chain alkyl group having 9 or more carbon atoms, and the constituent unit having a highly hydrophobic substituent derived from an aromatic group-containing macromonomer or the like, it is preferable that the self-dispersing polymer do not substantially include the (meth)acrylate and the constituent unit, and it is more preferable that the self-dispersing polymer do not include any of the (meth)acrylate and the constituent unit, from the viewpoint of dispersion stability.

The self-dispersing polymer according to the invention may be a random copolymer having the respective constituent units irregularly introduced, or may be a block copolymer having the respective constituent units regularly introduced. In the case of a block copolymer, the respective constituent units may be synthesized in any order of introduction, or an identical constituent component may be used two or more times. However, a random copolymer is preferred from the viewpoint of general-purpose utility and productivity.

The molecular weight of the self-dispersing polymer according to the invention is, in terms of weight average molecular weight, preferably in the range of 3000 to 200,000, more preferably in the range of 10,000 to 200,000, and even more preferably in the range of 30,000 to 150,000. When the weight average molecular weight is 3000 or greater, the amount of the water-soluble component may be effectively suppressed. Furthermore, when the weight average molecular weight is 200,000 or less, the self-dispersion stability may be increased.

The weight average molecular weight may be measured by gel permeation chromatography (GPC).

From the viewpoint of the control of hydrophilicity and hydrophobicity of the polymer, the self-dispersing polymer according to the invention is preferably a vinyl polymer which contains a structure derived from an alicyclic(meth)acrylate at a copolymerization ratio of from 20% by mass to 90% by mass, and at least one of a structure derived from a dissociable group-containing monomer and a structure derived from a (meth)acrylate containing a chain-like alkyl group having 1 to 8 carbon atoms, and which has an acid value of 20 to 120, a total content of the hydrophilic structural unit of 25% by mass or less, and a weight average molecular weight of 3000 to 200,000.

The self-dispersing polymer is more preferably a vinyl polymer which contains a structure derived from a bicyclic (meth)acrylate or a polycyclic(meth)acrylate having three or more rings at a copolymerization ratio of equal to or greater than 20% by mass and less than 90% by mass, a structure derived from a (meth)acrylate containing a chain-like alkyl group having 1 to 4 carbon atoms at a copolymerization ratio of equal to or greater than 10% by mass and less than 80% by mass, and a structure derived from a carboxyl group-containing monomer in an amount that gives an acid value in the range of 25 to 100, and which has a total content of the hydrophilic structural unit of 25% by mass or less, and a weight average molecular weight of 10,000 to 200,000.

Furthermore, the self-dispersing polymer is particularly preferably a vinyl polymer which contains a structure derived from a bicyclic(meth)acrylate or a polycyclic(meth)acrylate having three or more rings at a copolymerization ratio of equal to or greater than 40% by mass and less than 80% by mass, at least a structure derived from methyl(meth)acrylate or ethyl(meth)acrylate at a copolymerization ratio of equal to or greater than 20% by mass and less than 60% by mass, and a structure derived from acrylic acid or methacrylic acid in an amount that gives an acid value in the range of 30 to 80, and which has a total content of the hydrophilic structural unit of 25% by mass or less, and a weight average molecular weight of 30,000 to 150,000.

There are no particular limitations on the glass transition temperature of the self-dispersing polymer according to the invention, but from the viewpoint of the anti-blocking property and the abrasion resistance of images, the glass transition temperature is preferably 150° C. to 250° C., and more preferably 160° C. to 200° C.

When the glass transition temperature of the self-dispersing polymer is 150° C. or higher, the anti-blocking property (particularly under high-temperature, high-humidity conditions) is further enhanced. Furthermore, when the glass transition temperature is 250° C. or lower, the abrasion resistance of images is enhanced.

The glass transition temperature of the self-dispersing polymer may be appropriately controlled according to a conventionally used method. For example, the glass transition temperature of the self-dispersing polymer may be controlled to a desired range by appropriately selecting the type of the polymerizable group of the monomers that constitute the self-dispersing polymer, the type or composition ratio of the substituent on the monomers, the molecular weight of the polymer molecule, and the like.

For the glass transition temperature (Tg) of the self-dispersing polymer according to the invention, the measured Tg that may be obtained by actual measurement is applied. Specifically, the measured Tg means a value measured under the conventional measurement conditions using a differential scanning calorimeter (DSC) (trade name: EXSTAR 6220, manufactured by SII Nanotechnology, Inc.).

Exemplary compounds will be listed below as specific examples of the self-dispersing polymer, but the invention is not intended to be limited to these. The numbers within the parentheses represent the mass ratio of the copolymerized components.

Methyl methacrylate/isobornyl methacrylate/methacrylic acid copolymer (20/72/8), glass transition temperature: 180° C.

Methyl methacrylate/isobornyl methacrylate/methacrylic acid copolymer (40/52/8), glass transition temperature: 160° C.

Methyl methacrylate/isobornyl methacrylate/dicyclopentanyl methacrylate/methacrylic acid copolymer (20/62/10/8), glass transition temperature: 170° C.

Methyl methacrylate/dicyclopentanyl methacrylate/methacrylic acid copolymer (20/72/8), glass transition temperature: 160° C.

There are no particular limitations on the method for producing the self-dispersing polymer according to the invention, and the self-dispersing polymer may be produced by copolymerizing a monomer mixture by a known polymerization method. Among these polymerization methods, from the viewpoint of the droplet ejection stability obtainable when the self-dispersing polymer is used in the preparation of an ink composition, it is more preferable to carry out polymerization in an organic medium, and a solution polymerization method is particularly preferred.

In the method for producing the self-dispersing polymer of the invention, the water-insoluble polymer may be produced by subjecting a mixture containing a monomer mixture and if necessary, an organic solvent and a radical polymerization initiator, to a copolymerization reaction under an inert gas atmosphere.

There are no particular limitations on the method for producing an aqueous dispersion of the self-dispersing polymer particles according to the invention, and the aqueous dispersion of the self-dispersing polymer particles may be obtained by a known method. The process used for obtaining the self-dispersing polymer in the form of an aqueous dispersion is preferably a reverse phase emulsification method which includes the following step (1) and step (2).

Step (1): A step of obtaining a dispersion by stirring a mixture containing a water-insoluble polymer, an organic solvent, a neutralizing agent and an aqueous medium.

Step (2): A step of removing at least a part of the organic solvent from the dispersion.

The step (1) is preferably a treatment of first dissolving the water-insoluble polymer in an organic solvent, subsequently slowly adding a neutralizing agent and an aqueous medium thereto, and mixing and stirring the mixture to obtain a dispersion. As such, when the neutralizing agent and the aqueous medium are added to the water-insoluble polymer solution dissolved in the organic solvent, the self-dispersing polymer particles which do not require a strong shearing force and have a particle size that gives higher storage stability, may be obtained.

There are no particularly limitations on the method of stirring the mixture, and a mixing and stirring apparatus that is commonly used, or if necessary, a dispersing machine such as an ultrasonic dispersing machine or a high pressure homogenizer, may be used.

Preferred examples of the organic solvent include an alcohol-based solvent, a ketone-based solvent, and an ether-based solvent.

Examples of the alcohol-based solvent include isopropyl alcohol, n-butanol, t-butanol, and ethanol. Examples of the ketone-based solvent include acetone, methyl ethyl ketone, diethyl ketone, and methyl isobutyl ketone. Examples of the ether-based solvent include dibutyl ether and dioxane. Among these organic solvents, the ketone-based solvent such as methyl ethyl ketone, and the alcohol-based solvent such as isopropyl alcohol are preferred.

Furthermore, it is also preferable to use isopropyl alcohol and methyl ethyl ketone in combination. When these solvents are used in combination, the self-dispersing polymer particles which do not cause aggregation and precipitation or fusion between particles, and have a fine particle size with high dispersion stability, may be obtained. This may be thought to be because, for example, the polarity change from an oil system to an aqueous system during the phase reversal is moderated.

The neutralizing agent is used so that a part or all of the dissociable groups are neutralized, and the self-dispersing polymer forms a stable emulsified or dispersed state in water. When the self-dispersing polymer has an anionic dissociable group as a dissociable group, examples of the neutralizing agent to be used include basic compounds such as an organic amine compound, ammonia, and an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethylethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among them, from the viewpoint of the dispersion stabilization of the self-dispersing polymer particles in water, sodium hydroxide, potassium hydroxide, triethylamine and triethanolamine are preferred.

It is preferable to use these basic compounds in an amount of 5% by mole to 120% by mole, more preferably 20% by mole to 100% by mole, and even more preferably 30% by mole to 80% by mole, relative to 100% by mole of the dissociable group. When the content of the basic compound is set at 15% by mole or greater, an effect of stabilizing the dispersion of particles in water is manifested, and when the content of the basic compound is set at 80% by mole or less, an effect of reducing the content of the water-soluble component is obtained.

In the step (2), the aqueous dispersion of the self-dispersing polymer particles may be obtained by distilling off the organic solvent from the dispersion obtained in the step (1) by a conventional method such as distillation under reduced pressure, and thereby converting the phase to an aqueous phase. The organic solvent in the aqueous dispersion thus obtained is substantially removed, and the amount of the organic solvent in the aqueous dispersion is preferably 0.2% by mass or less, and more preferably 0.1% by mass or less.

The average particle size of the self-dispersing polymer particles according to the invention is preferably in the range of 1 to 100 nm, more preferably 3 to 80 nm, even more preferably 5 to 60 nm, and particularly preferably 5 to 40 nm. When the average particle size is 1 nm or greater, the production suitability is enhanced. Furthermore, when the average particle size is 100 nm or less, the storage stability is enhanced. The average particle size as used herein means a volume average particle size.

There are no particular limitations on the particle size distribution of the self-dispersing polymer particles, and any of polymer particles having a broad particle size distribution or polymer particles having a monodisperse particle size distribution may be used. Furthermore, two or more kinds of water-insoluble particles may be used in mixture.

The average particle size and particle size distribution of the self-dispersing polymer particles may be measured by using, for example, a dynamic light scattering method.

In the ink composition of the invention, it is preferable that the self-dispersing polymer particles be present in a form in which the self-dispersing polymer particles do not substantially contain a colorant.

The self-dispersing polymer particles of the invention have excellent self-dispersibility, and it is known that the stability obtainable when the polymer is dispersed alone is very high. However, since the self-dispersing polymer does not function effectively as, for example, a so-called dispersant which stably disperses a pigment, when the self-dispersing polymer according to the invention is present in the ink composition in a form in which the self-dispersing polymer contains a pigment, consequently the stability of the ink composition itself may decrease to a large extent.

The inkjet ink composition of the invention may contain a single kind of self-dispersing polymer particles, or may contain two or more kinds of self-dispersing polymer particles.

The content of the self-dispersing polymer particles in the ink composition of the invention is preferably 1% by mass to 30% by mass, more preferably 2% by mass to 20% by mass, and particularly preferably 2% by mass to 10% by mass, based on the inkjet ink composition, from the viewpoint of the glossiness of images or the like.

Furthermore, the mass ratio of the color material (colorant particles) to the self-dispersing polymer particles in the inkjet ink composition of the invention (color material/self-dispersing polymer particles) is preferably 1/0.5 to 1/10, and more preferably 1/1 to 1/4, from the viewpoint of the abrasion resistance of images or the like.

(Other Additives)

The inkjet ink composition of the invention may contain, if necessary, other additives in addition to the components described above.

Examples of the other additives according to the invention include known additives such as a discoloration preventing agent, an emulsion stabilizer, a penetration enhancing agent, an ultraviolet absorber, a preservative, an antifungal agent, a pH adjusting agent, a surface tension adjusting agent, a defoamant, a viscosity adjusting agent, a dispersant, a dispersion stabilizer, a rust preventing agent, and a chelating agent. These various additives may be added directly after the preparation of the inkjet ink composition, or may be added during the preparation of the inkjet ink composition. Specific examples of the other additives include those described in paragraphs [0153] to [0162] of JP-A No. 2007-100071.

Examples of the surface tension adjusting agent include a nonionic surfactant, a cationic surfactant, an anionic surfactant, and a betaine surfactant.

The amount of addition of the surface tension adjusting agent is preferably an amount of addition that is capable of adjusting the surface tension of the ink composition to 20 to 60 mN/m, more preferably an amount of addition that is capable of adjusting the surface tension to 20 to 45 mN/m, and even more preferably an amount of addition that is capable of adjusting the surface tension to 25 to 40 mN/m, so as to achieve satisfactory droplet ejection in an inkjet system.

The surface tension of the ink composition may be measured by, for example, using a plate method at 25° C.

Specific examples of the surfactant include, among hydrocarbons, anionic surfactants such as a fatty acid salt, an alkylsulfate ester salt, an alkyl benzenesulfonate, an alkyl naphthalenesulfonate, a dialkyl sulfosuccinate, an alkyl phosphate ester, a naphthalenesulfonic acid-formalin condensate, and a polyoxyethylene alkylsulfate ester salt; and nonionic surfactants such as a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylene alkylamine, a glycerin fatty acid ester, and an oxyethylene-oxypropylene block copolymer. Furthermore, SURFYNOLS (trade name, manufactured by Air Products & Chemicals, Inc.) and ORFINS (trade name, manufactured by Nisshin Chemical Industry Co., Ltd.), which are acetylene-based polyoxyethylene oxide surfactants, are also used with preference. An amine oxide type amphoteric surfactant such as N,N-dimethyl-N-alkylamine oxide is also preferred.

In addition, the surfactants described in pages (37) to (38) of JP-A No. 59-157636 and Research Disclosure No. 308119 (1989) may also be used.

The fluorine-based (fluoroalkyl-based) surfactants, silicone-based surfactants and the like described in JP-A No. 2003-322926, JP-A No. 2004-325707 and JP-A No. 2004-309806 may also be used so as to ameliorate the abrasion resistance.

These surface tension adjusting agents may also be used as defoamants, and a fluorine-based compound, a silicone-based compound, a chelating agent represented by EDTA, or the like may also be used.

Regarding the viscosity of the ink composition of the invention, in the case of performing the application of ink by an inkjet system, the viscosity is preferably in the range of 1 to 30 mPa·s, more preferably in the range of 1 to 20 mPa·s, even more preferably in the range of 2 to 15 mPa·s, and particularly preferably in the range of 2 to 10 mPa·s, from the viewpoint of the droplet ejection stability and the speed of aggregation.

The viscosity of the ink composition may be measured by, for example, using a Brookfield viscometer at 20° C.

The pH of the ink composition of the invention is preferably pH 7.5 to 10, and more preferably pH 8 to 9, from the viewpoint of the ink stability and the speed of aggregation. The pH of the ink composition is measured at 25° C. by a pH meter that is conventionally used (for example, a multi-function water quality meter (trade name: MM-60R, manufactured by DKK-Toa Corp.)).

Furthermore, the pH of the ink composition may be appropriately prepared by using an acidic compound or a basic compound. As the acidic compound or basic compound, any conventionally used compound may be used without any particular limitations.

[Treatment Liquid]

The treatment liquid is constituted to include at least one kind of wax and water, and to include, as necessary, a water-soluble organic solvent and other additives.

Examples of the wax include natural waxes and synthetic waxes.

Examples of the natural waxes include petroleum-based waxes, plant waxes and animal waxes. Examples of the petroleum-based waxes include paraffin wax, microcrystalline wax, and petrolatum. Examples of the plant waxes include carnauba wax, candelilla wax, rice wax and wood wax. Examples of the animal waxes include lanolin and beeswax.

Examples of the synthetic waxes include synthetic hydrocarbon-based waxes and modified waxes. Examples of the synthetic hydrocarbon-based waxes include polyethylene wax and Fischer-Tropsch wax. Examples of the modified waxes include paraffin wax derivatives, montan wax derivatives, and microcrystalline wax derivatives.

Among the waxes mentioned above, paraffin wax contains hydrocarbons having 20 to 40 carbon atoms as main components, and is therefore preferable from the viewpoint that the image glossiness or the effect of preventing moisture evaporation and retaining moisture at the nozzle tips in the inkjet head is excellent.

The polyethylene wax has excellent compatibility with resins, and is therefore preferable from the viewpoint that uniform satisfactory images are easily formed. Furthermore, since polyethylene wax is easily modified, the modified glycol-modified polyethylene wax may be imparted with wettability that is attributable to glycol, and is therefore more preferred from the viewpoint that a wettability effect of the ink composition at the nozzle tips is exhibited, and accordingly, ejection stability is more effectively exhibited.

Furthermore, the wax according to the invention is preferably at least one selected from a petroleum-based wax, a plant wax and a synthetic hydrocarbon-based wax, from the viewpoint of suppressing the generation of processing flaws and suppressing the feel of relief, and the wax is more preferably at least one selected from carnauba wax, paraffin wax and polyethylene wax.

The wax according to the invention is preferably used together with an emulsifying dispersant. As the emulsifying dispersant used in the invention, any dispersant may be selected from many conventionally known emulsifying dispersants to be used. A particularly preferred emulsifying dispersant according to the invention is a dispersant represented by the following formula (1):

$$(R^3)_a\text{-G-}(D)_d \qquad \text{Formula (1)}$$

wherein $R^3$ represents a substituted or unsubstituted alkyl group, alkenyl group, aralkyl group or aryl group, each having 10 to 60 carbon atoms; G represents a linking group having a valency of 2 to 7; D represents a group represented by $—(B)_n\text{-E}$, wherein B represents $—CH_2CH_2O—$, $—CH_2CH_2CH_2O—$, $—CH(CH_3)CH_2O—$ or $—CH_2CH(OH)CH_2O—$, and n represents an integer from 1 to 50. Here, E represents hydrogen, a substituted or unsubstituted alkyl group, aryl group, alkylcarbonyl group or arylcarbonyl group, each having 1 to 8 carbon atoms; a and d each represent an integer from 1 to 6; and $R^3$, D and E that are present in plural numbers may be identical with or different from each other.

The formula will be explained in more detail.

$R^3$ represents a substituted or unsubstituted, linear, branched or cyclic alkyl group, alkenyl group or aralkyl group, and a substituted or unsubstituted aryl group, each having 10 to 60 carbon atoms. Preferred examples of $R^3$ include $C_gH_{2g+1}$ (wherein g represents an integer from 12 to 60), eicosyl and docosanyl. Further examples include dodecyl, myristyl, cetyl, stearyl, oleyl, eicosyl, docosasyl, triacontasyl, tetracontasyl, heptacontasyl, dinonylphenyl, didodecylphenyl, tetradecylphenyl, tripentylphenyl, and dodecylnaphthyl. D represents a polyoxyalkylene group represented by $—(B)_n$-E. Here, B represents $—CH_2CH_2O—$, $CH_2CH_2CH_2O—$, $—CH(CH_3)CH_2O—$ or $—CH_2CH(OH)CH_2O—$; and n represents an integer of from 1 to 50. B is preferably $—CH_2CH_2O—$, and n is preferably an integer of 5 to 30. E represents hydrogen or a substituted or unsubstituted alkyl group, aryl group, alkylcarbonyl group, or arylcarbonyl group, each having 1 to 8 carbon atoms. The alkyl group is preferably methyl, ethyl, propyl, butyl, hexyl or cyclohexyl, and is particularly preferably methyl, ethyl, or propyl. The alkylcarbonyl group is preferably acetyl, propionyl, butyroyl, pivaloyl or cyclohexanecarbonyl, and is particularly preferably acetyl. The aryl group is preferably a phenyl group, and the arylcarbonyl group is preferably a benzoyl group. Particularly preferred examples of E include hydrogen, methyl, ethyl, propyl, acetyl, propionyl, and benzoyl.

G represents a linking group having a valency of 2 to 7, preferably a valency of 2 to 5, more preferably a valency of 2 to 4, and even more preferably a valency of 2 or 3, or represents a single bond. G preferably represents an alkylene group, an arylene group, or a composite group thereof. G may also be a divalent substituted or unsubstituted linking group that is linked by oxygen, an ester group, a heterogeneous atom such as sulfur, an amide group or a sulfonyl group. G is particularly preferably oxygen, an ester group, or an amide group. Letters a and d each represent an integer from 1 to 6. In addition, the dispersant represented by the formula (1) preferably has low solubility in an aqueous medium, and for example, the solubility of the dispersant in water is preferably 0.5% by mass or less (at 25° C.) and more preferably 0.1% by mass or less. Specific examples of the compound represented by the formula (1) are shown below, but the invention is not intended to be limited thereto.

WA-1

WA-2

WA-3

WA-4

WA-5

WA-6

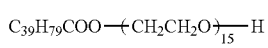

WA-7

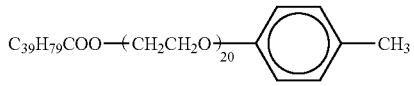

WA-8

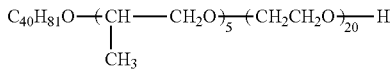

WA-9

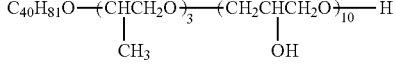

WA-10

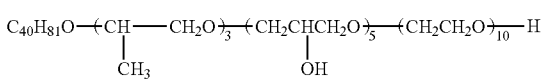

WA-11

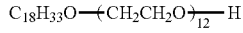

WA-12

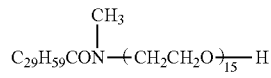

WA-13

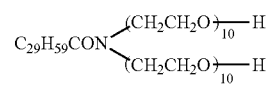

WA-14

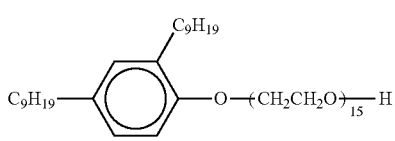

WA-15

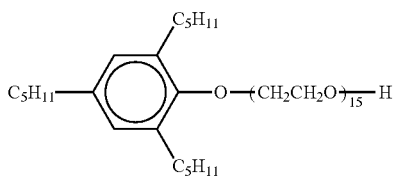

WA-16

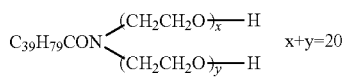

WA-17

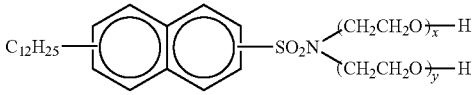

WA-18

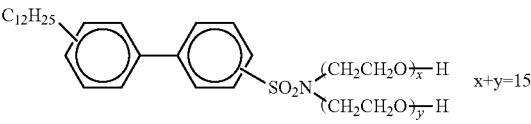

WA-19

The wax that is used in the invention is preferably added in the form of dispersion, and the solvent of the dispersion is preferably water, but the invention is not intended to be limited to this. For example, a conventionally used organic solvent may be appropriately selected and used at the time of dispersion.

Examples of the organic solvent include a ketone (acetone, methyl ethyl ketone, methyl isobutyl ketone, or cyclohexanone), an alcohol (a lower alcohol having 1 to 8 carbon atoms, for example, methyl alcohol, ethyl alcohol, isopropyl alcohol, butyl alcohol, hexyl alcohol, or octyl alcohol), a glycol derivative (cellosolve, ethylene glycol diethyl ether, propylene glycol monomethyl ether or the like), an ester of a lower fatty acid having 1 to 5 carbon atoms (ethyl acetate, butyl acetate, ethyl propionate or the like), a haloalkane (methylene dichloride, ethylene dichloride, trichlene, trichloromethane, trichloroethane, tetrachlorocarbon or the like), a hydrocarbon (octane, solvent naphtha, turpentine oil, petroleum ether, thinner, petroleum benzene, benzene, toluene, xylene or the like), a phenol (phenol, resorcinol or the like), an ether (tetrahydrofuran, dioxane or the like), a phosphoric acid ester (trimethyl phosphate, triethyl phosphate, tributyl phosphate or the like), DMF of amide compounds, and DMSO. Preferred examples of the organic solvent include an alcohol, a ketone, a glycol derivative, a lower fatty acid ester, a haloalkane, and a hydrocarbon. Particularly, in the solvent system used as a mixture with water, the organic solvent is preferably a solvent selected from an alcohol, a ketone and a glycol derivative, which form uniform solvents with water. Furthermore, as a solvent used without water, the organic solvent is preferably a solvent selected from a hydrocarbon, a ketone, a lower fatty acid ester and a haloalkane.

These allow the dispersion of wax to have excellent stability. The organic solvents described above may be used as mixtures of two or more kinds with solvents of identical or different kind.

Next, the dispersed particles of wax that are used in the invention will be described in more detail.

According to the invention, there are no particular limitations on the composition ratio of the two components constituting the dispersed wax particles that are formed from a wax and a dispersant represented by the formula (1), but it is preferable to use dispersed wax particles composed of 25% by mass to 99% by mass of a wax and 1% by mass to 75% by mass of a dispersant. This may be thought to be because as the content ratio of the wax increases, the characteristics of the dispersed wax particles are exhibited at the outermost surface.

Therefore, it is preferable that the content ratio of the dispersant represented by the formula (1) in the dispersed wax particles be as small as possible.

The dispersed wax particles that are used in the invention are preferably subjected in advance to so-called melt blending, by being blended at a temperature even higher than the higher melting point of the compound, before dispersing. Then, the dispersed wax particles may be finely dispersed by various dispersing methods, after a solvent that serves as a dispersing medium is similarly heated to a high temperature, and the molten mixture is added into the solvent. In addition, it is also preferable to add a solvent that has been heated into a molten mixture, and then to disperse and granulate the molten mixture. Alternatively, it is also acceptable to dissolve the molten mixture in a non-aqueous organic solvent that dissolves the wax or the dispersant, subsequently to finely disperse the solution in water using another water-soluble surfactant, and to add the fine dispersion directly into a treatment liquid as dispersed particles of wax. The non-aqueous organic solvent is preferably, for example, ethyl acetate.

Furthermore, it is also useful to remove the organic solvent after dispersing, and to use the resultant as a wax particle dispersion. In this case, it is advantageous that even if the melting points of the wax and the compound represented by the formula (1) are 100° C. or higher, these components may be melt-blended in an organic solvent at low temperature, and thus high-melting point dispersed wax particles in an aqueous system may be produced. Here, there are no particularly severe restrictions on the melting point of the wax and the compound represented by the formula (1), but an effective melting point is preferably from 50° C. to 200° C., more preferably 60° C. or higher, and particularly preferably from 80° C. to 150° C.

The solvent is most preferably water, from the viewpoint of being favorable to the environment during the preparation of the treatment liquid according to the invention. Therefore, in the case of using a wax having a melting point of 80° C., it is preferable to perform the dispersing at a water temperature of 80° C. or higher.

The wax according to the invention may be incorporated into the treatment liquid by any method, such as in the form of a solution dissolved in an appropriate solvent, in the form of an emulsified dispersion, or in the form of solid fine particle dispersion.

A well known example of the emulsifying dispersion method may be a method of dissolving the wax using an auxiliary solvent such as dibutyl phthalate, tricresyl phosphate, dioctyl sebacate, an oil of tri(2-ethylhexyl) phosphate, ethyl acetate or cyclohexanone, adding the emulsifying dispersant mentioned above, and mechanically producing an emulsified dispersion. In this situation, it is also preferable to add an α-methylstyrene oligomer, or a polymer such as poly (t-butylacrylamide), for the purpose of regulating the viscosity or refractive index of the oil droplets.

An example of the method of dispersing solid fine particles may be a method of preparing a solid dispersion by dispersing a wax powder in an appropriate solvent such as water using a ball mill, a colloid mill, a vibratory ball mill, a sand mill, a jet mill, a roller mill or an ultrasonicator. In that case, a protective colloid (for example, polyvinyl alcohol), or a surfactant (for example, an anionic surfactant such as sodium triisopropyl naphthalenesulfonate (a mixture of compounds having different positions of substitution for three isopropyl groups)) may be used. In the mills described above, beads of zirconia or the like are generally used as a dispersing medium. It is preferable to incorporate a preservative (for example, a benzoisothiazolinone sodium salt) into an aqueous dispersion.

A particularly preferred method is an emulsifying dispersion method, and it is preferable that the solid fine particles be incorporated into the treatment liquid as fine particles having an average particle size by volume basis of 0.01 µm to 10 µm, preferably 0.05 µm to 5 µm, and more preferably 0.1 µm to 2 µm.

It is preferable that the wax be contained in an amount of 0.001% by mass to 20% by mass, in terms of the wax solids concentration in the treatment liquid, from the viewpoint of enhancing the abrasion resistance, suppressing the generation of processing flaws, and suppressing the feel of relief, and the wax solids concentration is more preferably 0.01% by mass to 10% by mass, and even more preferably 0.1% by mass to 5% by mass.

Furthermore, it is preferable for the treatment liquid according to the invention to contain at least one selected from carnauba wax, paraffin wax and polyethylene wax at a content ratio of 0.01% by mass to 10% by mass, from the viewpoint of suppressing the generation of processing flaws and suppressing the feel of relief.

The content ratio of the color material in the treatment liquid according to the invention is no greater than 0.1% by mass, but the content ratio is preferably no greater than 0.01% by mass, in terms of solids concentration of the color material. This means that the treatment liquid does not substantially contain a color material. In addition, the color material for the treatment liquid has the same meaning as the color material for the ink composition and the color material for the ink composition and the color material for the treatment liquid may be the same or different from each other.

Furthermore, it is preferable that the treatment liquid further contain at least one water-soluble organic solvent, in addition to the wax and water. The details of the water-soluble organic solvent for the treatment liquid are the same as those of the water-soluble organic solvent for the ink composition, and the same applies to the preferred embodiments.

Moreover, the treatment liquid may contain other additives. The details of the other additives are the same as those of the other additives for the ink composition, and the same applies to the preferred embodiments.

According to the invention, the property values of the viscosity, surface tension and the like of the treatment liquid may be appropriately selected in accordance with the method of applying the treatment liquid or the like. Furthermore, the viscosity and surface tension of the treatment liquid are measured in the same manner as the viscosity and surface tension for the ink composition.

For example, the viscosity of the treatment liquid is preferably in the range of 1 to 30 mPa·s, more preferably in the range of 1 to 20 mPa·s, even more preferably in the range of 2 to 15 mPa·s, and particularly preferably in the range of 2 to 10 mPa·s. The surface tension of the treatment liquid is preferably in the range of 20 to 60 mN/m, more preferably in the range of 20 to 45 mN/m, and even more preferably in the range of 25 to 40 mN/m.

[Reaction Liquid]

The reaction liquid according to the invention is constituted to be capable of forming aggregates when brought into contact with the ink composition described above. Specifically, the reaction liquid preferably contains at least one aggregating component which is capable of forming aggregates by aggregating the dispersed particles of the color material (preferably, a pigment) and the like in the ink composition, and if necessary, the reaction liquid may be constituted to include other components as necessary. When the reaction liquid is used together with the ink composition, the speed of inkjet recording may be increased, and images having high density and resolution and having excellent image drawability (for example, reproducibility for fine lines or fine parts) may be obtained even by high-speed recording.

An example of the reaction liquid may be a liquid capable of causing the generation of aggregates by changing the pH of the ink composition. In this situation, the pH (25° C.±1° C.) of the reaction liquid is preferably 1 to 6, more preferably 1.2 to 5, and even more preferably 1.5 to 4, from the viewpoint of the speed of aggregation of the ink composition. In this case, the pH (25° C.±1° C.) of the ink composition that is used in the ejection step is preferably 7.5 to 9.5 (more preferably 8.0 to 9.0).

Inter alia, from the viewpoint of the image density, resolution and speeding-up of inkjet recording, it is preferable that the pH (25° C.) of the ink composition be 7.5 or higher, while the pH (25° C.) of the reaction liquid be 1.5 to 3.

The reaction liquid may be formed using at least one acidic compound as the aggregating component. Examples of the acidic compound that may be used include compounds having a phosphoric acid group, a phosphonic acid group, a phosphinic acid group, a sulfuric acid group, a sulfonic acid group, a sulfinic acid group or a carboxyl group, or salts thereof (for example, a polyvalent metal salt). Among them, from the viewpoint of the speed of aggregation of the ink composition, the acidic compound is preferably a compound having a phosphoric acid group or a carboxyl group, and is more preferably a compound having a carboxyl group.

The compound having a carboxyl group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives of these compounds and salts of the compounds and the derivatives (for example, polyvalent metal salts). These compounds may be used singly or may be used in combination of two or more kinds.

The reaction liquid according to the invention may be constituted to further include a water-based solvent (for example, water), in addition to the acidic compound and the like.

The content of the acidic compound in the reaction liquid is preferably 5% by mass to 95% by mass, more preferably 10% by mass to 80% by mass, even more preferably 15% by mass to 50% by mass, and particularly preferably 18% by mass to 30% by mass, relative to the total mass of the reaction liquid, from the viewpoint of the aggregating effects.

According to the invention, a reaction liquid containing a polyvalent metal salt may be used, and thereby, high-speed aggregatability may be enhanced. Examples of the polyvalent metal salt include the salts of the alkaline earth metals of Group 2 of the Periodic Table (for example, magnesium and calcium), the transition metals of Group 3 of the Periodic Table (for example, lanthanum), the cations of Group 13 of the Periodic Table (for example, aluminum), and lanthanides (for example, neodymium). Suitable examples of the metal salts include carboxylates (formate, acetate, benzoate, and the like), nitrates, chlorides and thiocyanates. Among them, preferred examples include a calcium salt or magnesium salt of a carboxylic acid (formic acid, acetic acid, benzoic acid or the like), a calcium salt or magnesium salt of nitric acid, calcium chloride, magnesium chloride, and a calcium salt or magnesium salt of thiocyanic acid. These polyvalent metal salts may be used singly, or may be used in combination of two or more kinds.

The content of the metal salt in the reaction liquid is preferably 1% by mass to 10% by mass, more preferably 1.5% by mass to 7% by mass, and even more preferably in the range of 2% by mass to 6% by mass, from the viewpoint of the aggregating effect.

Furthermore, the reaction liquid may be constituted to include at least one cationic organic compound as the aggregating component. Examples of the cationic organic compound include cationic polymers such as a poly(vinyl pyridine) salt, polyalkylaminoethyl acrylate, polyalkylaminoethyl methacrylate, poly(vinyl imidazole), polyethyleneimine, polybiguanide, polyguanide, polyallylamine, and derivatives thereof.

The weight average molecular weight of the cationic polymer is such that a smaller molecular weight is preferred from the viewpoint of the viscosity of the reaction liquid. In the case of applying the reaction liquid onto a recording medium by an inkjet method, the weight average molecular weight is preferably in the range of 1,000 to 500,000, more preferably in the range of 1,500 to 200,000, and even more preferably in the range of 2,000 to 100,000. When the weight average molecular weight is 1000 or greater, it is advantageous in view of the speed of aggregation, and when the weight average molecular weight is 500,000 or less, it is advantageous in view of the ejection reliability. However, an exception is made in the case of applying the reaction liquid onto a recording medium by a method other than an inkjet method.

In addition, preferred examples of the cationic organic compound include compounds of primary, secondary or tertiary amine salt type. Examples of these amine salt type compounds include cationic compounds, such as compounds such as hydrochlorides or acetates (for example, laurylamine, palmitylamine, stearylamine, and rosin amine), quaternary ammonium salt type compounds (for example, laurylthrimethylammonium chloride, cetyltrimethylammonium chloride, lauryldimethylbenzylammonium chloride, benzyltributylammonium chloride, and benzalkonium chloride), pyridinium salt type compounds (for example, cetylpyridinium chloride, and cetylpyridinium bromide), imidazoline type cationic compounds (for example, 2-heptadecenylhydroxyethylimidazoline), and ethylene oxide adducts of higher alkylamines (for example, dihydroxyethylstearylamine); and amphoteric surfactants exhibiting cationicity in a desired pH region, such as amino acid type amphoteric surfactants, compounds of R—NH—$CH_2CH_2$—COOH type (wherein R represents an alkyl group or an aryl group), carboxylate type amphoteric surfactants (for example, stearyl dimethylbetaine, and lauryl dihydroxyethylbetaine), and amphoteric surfactants of sulfuric acid ester type, sulfonic acid type or phosphoric acid ester type. Among them, a cationic organic compound having a valency of 2 or greater is preferred.

These compounds may be used singly, or may be used in combination of two or more kinds.

The content of the cationic organic compound in the reaction liquid is preferably 1% by mass to 50% by mass, and more preferably 2% by mass to 30% by mass, from the viewpoint of the aggregating effect.

Among the compounds described above, the aggregating component is preferably a carboxylic acid having a valency of 2 or greater, or a cationic organic compound having a valency of 2 or greater, from the viewpoint of the aggregatability and abrasion resistance of images.

The viscosity of the reaction liquid is preferably in the range of 1 to 30 mPa·s, more preferably in the range of 1 to 20 mPa·s, even more preferably in the range of 2 to 15 mPa·s, and particularly preferably in the range of 2 to 10 mPa·s, from the viewpoint of the speed of aggregation of the ink composition. Here, the viscosity is measured using a viscometer (trade name: TV-22, manufactured by Toki Sangyo Co., Ltd.) under the condition of 20° C.

Furthermore, the surface tension of the reaction liquid is preferably 20 to 60 mN/m, more preferably 20 to 45 mN/m, and even more preferably 25 to 40 mN/m, from the viewpoint of the speed of aggregation of the ink composition. Here, the surface tension is measured using an automatic surface tensiometer (trade name: CBVP-Z, manufactured by Kyowa Interface Science Co., Ltd.) under the condition of 25° C.

(Other Components)

The reaction liquid according to the invention may generally contain a water-soluble organic solvent in addition to the aggregating component, and to an extent of not impairing the effects of the invention, the reaction liquid may be constituted to further include various other additives. The details of the water-soluble organic solvent are the same as those of the water-soluble organic solvent for the ink composition described above.

Examples of the other additives include known additives such as a drying preventing agent (wetting agent), a discoloration preventing agent, an emulsion stabilizer, a penetration enhancing agent, an ultraviolet absorber, a preservative, an antifungal agent, a pH adjusting agent, a surface tension adjusting agent, a defoamant, a viscosity adjusting agent, a dispersant, a dispersion stabilizer, a rust preventing agent, and a chelating agent, and those described above as specific examples of the other additives contained in the ink composition may be applied.

Exemplary embodiments of the invention will be listed below.

<1> An inkjet image forming method comprising:

forming an image by applying an ink composition comprising a first color material and water onto a recording medium; and applying a treatment liquid comprising a wax and water onto the image, wherein the treatment liquid comprises a second color material, and the first color material and the second color material may be the same or different.

<2> The inkjet image forming method as described in the item <1>, wherein the wax is at least one selected from the group consisting of carnauba wax, paraffin wax and polyethylene wax.

<3> The inkjet image forming method as described in the item <1> or <2>, wherein the recording medium is a coated paper having a base paper and a coating layer which is provided on the base paper, the coating layer comprising at least one of kaolin or calcium bicarbonate.

<4> The inkjet image forming method as described in any one of the items <1> to <3>, wherein the recording medium is at least one selected from the group consisting of an art paper, a coated paper, a lightweight coated paper and a finely coated paper.

<5> The inkjet image forming method as described in any one of the items <1> to <4>, wherein the first color material comprised in the ink composition is a pigment.

<6> The inkjet image forming method as described in any one of the items <1> to <5>, wherein the ink composition further comprises resin particles.

<7> The inkjet image forming method as described in the item <6>, wherein the resin particles are self-dispersing polymer particles.

<8> The inkjet image forming method as described in the item <6> or <7>, wherein the resin particles have an anionic group which is at least one of a carboxyl group or a salt thereof.

<9> The inkjet image forming method as described in any one of the items <6> to <8>, wherein the resin particles comprise a resin synthesized in an organic solvent and having a carboxyl group, with at least a part of the carboxyl group being neutralized, and the resin particles being dispersed in water which serves as a continuous phase.

<10> The inkjet image forming method as described in any one of the items <1> to <9>, wherein the wax in the treatment liquid is included in an amount of 0.001% by mass to 20% by mass in terms of the wax solids concentration.

<11> The inkjet image forming method as described in any one of the items <1> to <10>, wherein a content of the second color material in the treatment liquid is no greater than 0.1% by mass.

EXAMPLES

Hereinafter, the invention will be specifically described by way of Examples, but the invention is not intended to be limited to these Examples. Unless particularly stated otherwise, the units "part" and "%" are on a mass basis.

<Production of Coated Paper A>

—Preparation of Coating Liquid for Coating Layer—

100 parts of kaolin (trade name: KAOBRITE 90, manufactured by Shiraishi Calcium Kaisha, Ltd.) and 1.2 parts of 40% sodium polyacrylate (trade name: ARON T-50, manufactured by Toagosei Co., Ltd.) were mixed, and the mixture was dispersed in 49.6 parts of water. To this dispersion, 100 parts of a 7% aqueous solution of PVA245 (trade name, manufactured by Kuraray Co., Ltd.), 3.7 parts of a 10% aqueous solution of EMULGEN 109P (trade name, manufactured by Kao Corp.) and 6.1 parts of citric acid were added. Thus, a coating liquid for a coating layer having a final solids concentration of 27% was prepared.

—Formation of Coating Layer—

The coating liquid for a coating layer was applied on both sides of a high quality paper (trade name: SHIRAOI, manufactured by Nippon Paper Group) having a basis weight of 81.4 g/m$^2$, using an extrusion die coater, on one side each time so as to obtain a dry weight of 15 g/m$^2$ per side. Each side of the coated paper was dried for one minute at a temperature of 70° C. and at an air speed of 10 m/sec, to form a coating layer on both sides, and thus a coated paper A was produced. Here, the thickness of each coating layer thus formed was 12.1 μm.

<Preparation of Ink Composition>

(Synthesis of Polymeric Dispersant P-1)

88 g of methyl ethyl ketone was introduced into a 1000-ml three-necked flask equipped with a stirrer and a cooling tube, and the content was heated to 72° C. under a nitrogen atmosphere. To this flask, a solution prepared by dissolving 0.85 g of dimethyl 2,2'-azobisisobutyrate, 60 g of benzyl methacrylate, 10 g of methacrylic acid and 30 g of methyl methacrylate in 50 g of methyl ethyl ketone was added dropwise over 3 hours. After completion of the dropwise addition, the reaction solution was allowed to further react for one hour, and then a solution prepared by dissolving 0.42 g of dimethyl 2,2'-azobisisobutyrate in 2 g of methyl ethyl ketone was added to the reaction solution. The temperature of the resulting mixture was raised to 78° C., and the mixture was heated for 4 hours. The reaction solution thus obtained was re-precipitated two times in a large excess of hexane, and the resin precipitated therefrom was dried. Thus, 96 g of a polymeric dispersant P-1 was obtained.

The composition of the resin thus obtained was confirmed by $^1$H-NMR, and a weight average molecular weight (Mw) determined by GPC was 44,600. Furthermore, an acid value was determined by the method described in JIS Standards (JIS K0070: 1992), and the acid value was 65.2 mg KOH/g.

(Preparation of Dispersion of Resin-Coated Cyan Pigment Particles)

10 parts of Pigment Blue 15:3 (trade name: PHTHALOCYANINE BLUE A220, manufactured by Dainichiseika Color & Chemicals Manufacturing Co., Ltd.), 5 parts of the polymeric dispersant P-1, 42 parts of methyl ethyl ketone, 5.5 parts of a 1 mol/L aqueous solution of sodium hydroxide and 87.2 parts of ion exchanged water were mixed, and the mixture was dispersed for 2 to 6 hours in a bead mill using 0.1-mmφ zirconia beads.

From the dispersion thus obtained, methyl ethyl ketone was removed at 55° C. under reduced pressure, and a portion of water was further removed therefrom. Subsequently, the dispersion was centrifuged for 30 minutes at 8000 rpm using a HIGH SPEED REFRIGERATED CENTRIFUGE 7550 (trade name, manufactured by Kubota Corporation) and using a 50-mL centrifuge tube, and thus the supernatant excluding the precipitates was collected. Thus, a dispersion of resin-coated cyan pigment particles having a solids concentration of the color material of 15.0% by mass was obtained.

(Preparation of Dispersion of Resin-Coated Magenta Pigment Particles)

A dispersion of resin-coated magenta pigment particles having a solids concentration of 15.0% by mass was obtained in the same manner as in the preparation of the dispersion of resin-coated cyan pigment particles, except that Pigment Red 122 (trade name: CROMOPHTAL JET MAGENTA DMQ, manufactured by Ciba-Geigy Japan, Ltd.) was used as a magenta pigment, in place of Pigment Blue 15:3.

(Preparation of Aqueous Dispersion of Resin Particles B-1)

540.0 g of methyl ethyl ketone was introduced into a 2-L three-necked flask equipped with a mechanical stirrer, a thermometer, a reflux cooling tube and a nitrogen gas inlet tube, and the temperature of the content was raised to 75° C. While the temperature inside the reaction vessel was maintained at 75° C., a mixed solution containing 216.0 g of methyl methacrylate, 270.0 g of isobornyl methacrylate, 54.0 g of methacrylic acid, 108 g of methyl ethyl ketone, and 2.16 g of "V-601" (trade name, manufactured by Wako Pure Chemical Industries, Ltd.; polymerization initiator), was added dropwise to the reaction vessel at a constant rate so that the dropwise addition was completed in 2 hours. After completion of the dropwise addition, a solution containing 1.08 g of "V-601" and 15.0 g of methyl ethyl ketone was added to the flask, and the mixture was stirred for 2 hours at 75° C. Subsequently, a solution containing 0.54 g of "V-601" and 15.0 g of methyl ethyl ketone was further added to the flask, and the mixture was stirred for 2 hours at 75° C. Subsequently, the mixture was heated to 85° C. and was continuously stirred for another 2 hours. Thus, a resin solution of a methyl methacrylate/isobornyl methacrylate/methacrylic acid (=40/50/10 [mass ratio]) copolymer was obtained.

The copolymer thus obtained had a weight average molecular weight (Mw) of 60,000, and an acid value of 65.1 mg KOH/g. Here, the weight average molecular weight was measured by gel permeation chromatography (GPC) and was calculated relative to polystyrene standards. GPC was carried out using HLC-8020 GPC (trade name, manufactured by Tosoh Corp.), and using TSKGEL SUPER HZM-H, TSKGEL SUPER HZ4000, and TSKGEL SUPER HZ200 (all trade names, manufactured by Tosoh Corp.) as a column and tetrahydrofuran (THF) as an eluent. The acid value was determined by the method described in the JIS Standards (JIS K0070: 1992).

Thereafter, 588.2 g of the resin solution was weighed, and 165 g of isopropanol and 151.0 ml of a 1 mol/L aqueous solution of sodium hydroxide were added thereto. The temperature inside the reaction vessel was raised to 80° C. Subsequently, 718 g of distilled water was added dropwise to the reaction vessel at a rate of 20 ml/min to obtain an aqueous dispersion. Subsequently, under the atmospheric pressure, the content inside the reaction vessel was maintained at a temperature of 80° C. for 2 hours, at a temperature of 85° C. for 2 hours, and at a temperature of 90° C. for 2 hours, and then the solvent was distilled off. Furthermore, the pressure inside the reaction vessel was reduced, and isopropanol, methyl ethyl ketone and distilled water were distilled off. Thus, an aqueous dispersion of a self-dispersing polymer B-1 (resin particles) having a solids content of 25.0% by mass was obtained.

(Preparation of Ink Composition)

The dispersions of the resin-coated pigment particles thus obtained were used, and various components were mixed to obtain the respective compositions indicated in Table 1. Subsequently, the mixtures were respectively filled in plastic disposable syringes and filtered through 5-μm PVDF filters (trade name: MILLEX-SV, manufactured by Millipore Corp.; diameter 25 mm). Thus, cyan inks and magenta inks were respectively prepared. The unit for the values indicated in the table is "parts."

TABLE 1

|  |  | C-1 | C-2 | M-1 | M-2 |
|---|---|---|---|---|---|
| Pigment dispersion | Pigment dispersion | Cyan | Cyan | Magenta | Magenta |
|  | Amount of addition | 16.7 | 16.7 | 33.3 | 33.3 |
| Resin particle dispersion | B-1 | 32.0 | — | 24.0 | — |
| Water-soluble organic solvent | GP250 | 8.0 | 8.0 | 8.0 | 8.0 |
|  | TPGmME | 8.0 | 8.0 | 8.0 | 8.0 |
| ORFIN E1010 (surfactant) |  | 1.0 | 1.0 | 1.0 | 1.0 |
| Ultrapure water |  | 34.3 | 66.3 | 25.7 | 49.7 |

(Preparation of Reaction Liquid)

Various components of the following composition were mixed, and thus a reaction liquid was prepared. The pH of the reaction liquid was 1.0.

| - Composition of reaction liquid - | |
|---|---|
| Malonic acid (manufactured by Tokyo Chemical Industry Co., Ltd.) | 11% |
| DL-malic acid (manufactured by Tokyo Chemical Industry Co., Ltd.) | 15% |
| Diethylene glycol monobutyl ether (manufactured by Wako Pure Chemical Industries, Ltd.) | 4% |
| Tripropylene glycol monomethyl ether (manufactured by Wako Pure Chemical Industries, Ltd.) | 4% |
| Ion-exchanged water | 66% |

(Preparation of Treatment Liquid)

Various components were mixed to obtain the respective compositions indicated in Table 2. Subsequently, the mixtures were respectively filled in plastic disposable syringes and filtered through 5-μm PVDF filters (trade name: MILLEX-SV, manufactured by Millipore Corp.; diameter 25 mm). Thus, treatment liquids V-1 to V-5 were respectively prepared. The unit for the values indicated in the table is "parts." Furthermore, CELLOSOL 524 (trade name) is a carnauba wax dispersion (solids concentration 30%) manufactured by Chukyo Yushi Co., Ltd.; TRASOL PF60 (trade name) is a paraffin wax dispersion (solids concentration 40%) manufactured by Chukyo Yushi CO., Ltd.; and POLYRON P502 (trade name) is a polyethylene wax dispersion (solids concentration 30%) manufactured by Chukyo Yushi Co., Ltd.

TABLE 2

|  |  | V-1 | V-2 | V-3 | V-4 | V-5 |
|---|---|---|---|---|---|---|
| Wax dispersion | CELLOSOL 524 | 3.3 | — | — | 10.0 | — |
|  | TRASOL PF60 | — | 2.5 | — | — | — |
|  | POLYRON P502 | — | — | 3.3 | — | — |
| Resin particle dispersion | B-1 | — | — | — | — | 32.0 |
| Water-soluble organic solvent | GP250 | 10 | 10 | 10 | — | 10 |
|  | DEGmBE | — | — | — | 4 | — |
|  | TPGmME | 6 | 6 | 6 | 4 | 6 |
| ORFIN E1010 (surfactant) |  | 1 | 1 | 1 | 1 | 1 |
| Ultrapure water |  | 79.7 | 80.5 | 79.7 | 81.0 | 51.0 |

Example

[Formation of Inkjet Image]

A recording medium was fixed on a stage that was capable of moving in a straight line in a predetermined direction at 500 mm/second, and one of the reaction liquids obtained as described above was applied on this recording medium with a wire bar coater in an amount of coating of about 1.5 g/m². Immediately after the application, the recording medium was dried for 2 seconds at 50° C. Subsequently, a GELJET GX5000 PRINTER HEAD (trade name, manufactured by Ricoh Company, Ltd.; full line head) was fixed and arranged such that the line head direction (fast scanning direction) along which nozzles were aligned was tilted by 75.7° relative to the direction orthogonal with the moving direction of the stage (slow scanning direction), and while the recording medium was moved at a constant speed in the slow scanning direction, a cyan ink was ejected by a line system under the ejection conditions of an ink droplet amount of 2.4 pL, an ejection frequency of 24 kHz and a resolution of 1200 dpi×1200 dpi. Thus, an image of cyan color was printed. Subsequently, a magenta ink was ejected to be superimposed on this image of cyan color, and thus an image of magenta color was printed. At this time, the time interval between the completion of droplet ejection of the cyan ink and the initiation of droplet ejection of the magenta ink was set at 50 milliseconds.

(Application of Treatment Liquid)

The application of the treatment liquid was carried out by any of the following A: inkjet method and B: coating method.

—A: Inkjet Method—

The treatment liquid was ejected by a line system on the image that had been already formed under the same ejection conditions as described above. In this case, the amount of ejection of the treatment liquid was regulated by the data of the image tlit had been already formed on the recording medium, and in the areas where the images had been drawn, the treatment liquid was ejected under the ejection conditions of a treatment liquid droplet amount of 2.4 pL, an ejection frequency of 24 kHz and a resolution of 1200 dpi×1200 dpi in the same manner as described above for image forming. In the areas where the images were not drawn, the treatment liquid was not ejected. The time interval between the completion of droplet ejection of the magenta ink and the initiation of droplet ejection of the treatment liquid was set at 50 milliseconds.

—B: Coating Method—

After the formation of images, the recording medium was dried for 3 seconds at 50° C., and then the treatment liquid was applied over the entire surface of the recording medium where the images had been formed, using a wire bar coater in an amount of coating of about 1.5 g/m².

(Fixing)

Immediately after the application of the treatment liquid, the recording medium was dried for 3 seconds at 50° C. and was subjected to a fixing treatment by passing through between a pair of fixing rollers heated to 60° C., at a nip pressure of 0.20 MPa and a nip width of 4 mm. Thus, an evaluation sample was obtained. The fixing rollers are composed of a heating roll having a cylindrical metal core made of SUS, which has a halogen lamp mounted inside and has the surface coated with a silicone resin, and a counter roll that is pressing against the heating roll.

The formation of inkjet images was carried out by changing the type of the recording medium, the types of the cyan ink composition and magenta ink composition, the type of the treatment liquid, and the method of applying the treatment liquid, according to the combinations indicated in Table 3, and thus the respective samples for evaluation were obtained.

TABLE 3

| | Image formation | | | Application of treatment liquid | |
|---|---|---|---|---|---|
| | Recording medium | Cyan ink | Magenta ink | Treatment liquid | Application method |
| Example 1 | OK TOPCOAT | C-1 | M-1 | V-1 | A |
| Example 2 | TOKUBISHI ART DOUBLE-SIDED N | C-1 | M-1 | V-1 | A |
| Example 3 | NEW AGE | C-1 | M-1 | V-1 | A |
| Example 4 | COATED PAPER A | C-1 | M-1 | V-1 | A |
| Example 5 | OK TOPCOAT | C-1 | M-1 | V-2 | A |
| Example 6 | OK TOPCOAT | C-1 | M-1 | V-3 | A |
| Example 7 | OK TOPCOAT | C-1 | M-1 | V-4 | B |
| Example 8 | TOKUBISHI ART DOUBLE-SIDED N | C-1 | M-1 | V-4 | B |
| Example 9 | NEW AGE | C-1 | M-1 | V-4 | B |
| Example 10 | COATED PAPER A | C-1 | M-1 | V-4 | B |
| Example 11 | OK TOPCOAT | C-2 | M-2 | V-1 | A |
| Comparative Example 1 | OK TOPCOAT | C-1 | M-1 | — | — |
| Comparative Example 2 | OK TOPCOAT | C-1 | M-1 | V-5 | A |

<Evaluation>

The following evaluations were carried out on the samples for evaluation obtained as described above. The evaluation results are presented in Table 4.

(Abrasion Resistance)

An unprinted TOKUBISHI ART DOUBLE-SIDED N (trade name) cut to a size of 10 mm×50 mm was wound around a paperweight (weight 470 g, size 15 mm×30 mm×120 mm) (the area of the unprinted TOKUBISHI ART DOUBLE-SIDED N brought into contact with the sample for evaluation was 150 mm$^2$), and the sample for evaluation produced as described above was rubbed by the paper weight back and forth for 3 times (corresponding to a load of 260 kg/m$^2$). The printed surface after rubbing was visually observed and was evaluated according to the following evaluation criteria.

—Evaluation Criteria—

A: Peeling of the image on the printed surface was not at all recognized.

B: Slight peeling of the image on the printed surface was recognized, but at a level without any problem for practical use.

C: Peeling of the image on the printed surface was recognized at a level with problems for practical use.

(Scratch Resistance)

A stainless steel roll holder was mounted on a surface property analyzer (trade name: TYPE 14DR, manufactured by Shinto Scientific Co., Ltd.), and the surface of a 50-mm image on the sample for evaluation was rubbed by the holder under a load of 30 g at 6000 mm/min. Thus, the generation of scratches by metal was visually observed and was evaluated according to the following evaluation criteria.

—Evaluation Criteria—

A: Scratches of the image on the printed surface were not recognized.

B: Slight scratches of the image on the printed surface were recognized, but at a level without any problems for practical use.

C: Scratches of the image on the printed surface were recognized at a level with problems for practical use.

(Feel of Relief)

The boundaries between the image areas and the non-image areas in the image formed on the sample for evaluation were visually observed and were evaluated according to the following evaluation criteria.

—Evaluation Criteria—

A: The boundaries between the image areas and the non-image areas were flat, and no particular sense of abnormality was recognized.

B: A sense of abnormality such that the image areas bulged at the boundaries between the image areas and the non-image areas, was slightly recognized, but at a level without any problems for practical use.

C: A sense of abnormality such that the image areas bulged at the boundaries between the image areas and the non-image areas, was recognized at a level with problems for practical use.

TABLE 4

| | Abrasion resistance | Scratch resistance | Feel of relief |
|---|---|---|---|
| Example 1 | A | A | A |
| Example 2 | A | A | A |
| Example 3 | A | A | A |
| Example 4 | A | A | A |
| Example 5 | A | A | A |
| Example 6 | A | A | A |
| Example 7 | A | A | B |
| Example 8 | A | A | B |
| Example 9 | A | A | B |
| Example 10 | A | A | B |
| Example 11 | B | A | A |
| Comparative Example 1 | B | C | C |
| Comparative Example 2 | A | C | C |

It is understood from Table 4 that according to the inkjet image forming method of the invention, the generation of processing flaws in each recording medium where the image has been formed thereon, is suppressed. Furthermore, it is understood that the sense of abnormality (feel of relief) in the image quality that is attributable to the height of dots (pile height) that constitute the image, is suppressed.

In the images formed by using the clear ink described in JP-A No. 2007-291399, abrasion resistance is improved to a certain extent, but there are occasions in which the images are prone to become brittle and processing flaws occur when a recorded matter is processed. Furthermore, in the ink described in Japanese Patent No. 2,867,491, the height of dots (pile height) that constituted the image is likely to be increased, and there are occasions in which there occurs the sense of abnormality (feel of relief) in the images that is attributable to the increased height of dots.

The invention provides an inkjet image forming method which suppresses the generation of processing flaws when a recorded matter having an image formed thereon is processed, and is capable of forming images with suppressed feel of relief.

What is claimed is:

1. An inkjet image forming method comprising:
    forming an image by applying an ink composition comprising a first color material, a first water-soluble organic solvent, and water onto a recording medium; and
    applying a treatment liquid comprising a wax, a second water-soluble organic solvent, and water onto the image, the second water-soluble organic solvent being the same as the first water-soluble organic solvent in the ink composition,
    wherein the treatment liquid comprises a second color material at a content of less than 0.1% by mass, and the first color material and the second color material may be the same or different.

2. The inkjet image forming method of claim 1, wherein the wax is at least one selected from the group consisting of carnauba wax, paraffin wax and polyethylene wax.

3. The inkjet image forming method of claim 1, wherein the recording medium is a coated paper having a base paper and a coating layer which is provided on the base paper, the coating layer comprising at least one of kaolin or calcium bicarbonate.

4. The inkjet image forming method of claim 1, wherein the recording medium is at least one selected from the group consisting of an art paper, a coated paper, a lightweight coated paper and a finely coated paper.

5. The inkjet image forming method of claim 1, wherein the first color material in the ink composition is a pigment.

6. The inkjet image forming method of claim 1, wherein the ink composition further comprises resin particles.

7. The inkjet image forming method of claim 6, wherein the resin particles are self-dispersing polymer particles.

8. The inkjet image forming method of claim 6, wherein the resin particles have an anionic group which is at least one of a carboxyl group or a salt thereof.

9. The inkjet image forming method of claim 6, wherein the resin particles comprise a resin synthesized in an organic solvent and having a carboxyl group, with at least a part of the carboxyl group being neutralized, and the resin particles being dispersed in water which serves as a continuous phase.

10. The inkjet image forming method of claim 1, wherein the wax in the treatment liquid is included in an amount of from 0.001% by mass to 20% by mass in terms of the wax solids concentration.

11. The inkjet image forming method of claim 1, further comprising applying a reaction liquid comprising an aggregating component that is capable of forming an aggregate when brought into contact with the ink composition onto the image.

* * * * *